(12) United States Patent
Xu et al.

(10) Patent No.: US 12,401,456 B2
(45) Date of Patent: Aug. 26, 2025

(54) COMMUNICATION METHOD AND APPARATUS

(71) Applicant: Huawei Technologies Co., Ltd., Shenzhen (CN)

(72) Inventors: Xiaoying Xu, Shenzhen (CN); Chunhua You, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 381 days.

(21) Appl. No.: 18/058,976

(22) Filed: Nov. 28, 2022

(65) Prior Publication Data

US 2023/0089933 A1  Mar. 23, 2023

Related U.S. Application Data

(63) Continuation of application No. PCT/CN2021/093585, filed on May 13, 2021.

(30) Foreign Application Priority Data

May 28, 2020 (CN) .......................... 202010469461.9

(51) Int. Cl.
*H04L 1/1809* (2023.01)
*H04L 1/20* (2006.01)
*H04W 24/08* (2009.01)
*H04W 28/04* (2009.01)
(Continued)

(52) U.S. Cl.
CPC .............. *H04L 1/1809* (2013.01); *H04L 1/20* (2013.01); *H04W 24/08* (2013.01); *H04W 28/04* (2013.01); *H04W 36/0064* (2023.05); *H04W 36/302* (2023.05)

(58) Field of Classification Search
CPC ... H04W 24/08; H04W 28/04; H04W 36/302; H04W 36/0064; H04L 1/1809
See application file for complete search history.

(56) References Cited

U.S. PATENT DOCUMENTS 8,638,707 B2 * 1/2014 Chun ...................... H04W 4/06
370/312
2010/0265915 A1 * 10/2010 Sun ................... H04W 36/0033
370/331
(Continued)

FOREIGN PATENT DOCUMENTS

CN  109788509 A  5/2019
CN  110636507 A  12/2019
(Continued)

OTHER PUBLICATIONS

Huawei et al., "General LCP enhancement for IIoT", 3GPP Draft; R2-1901446, Feb. 15, 2019, XP051602805, 4 pages.
(Continued)

*Primary Examiner* — Melanie Jagannathan
(74) *Attorney, Agent, or Firm* — Slater Matsil, LLP

(57) ABSTRACT

A target network device of a terminal device receives N data packets of a first service and auxiliary information from a source network device, where the auxiliary information indicates a transmission status of at least one data packet before the N data packets; and the target network device determines the transmission status of the at least one data packet.

20 Claims, 12 Drawing Sheets

(51) Int. Cl.
*H04W 36/00* (2009.01)
*H04W 36/30* (2009.01)

(56) References Cited

U.S. PATENT DOCUMENTS

| | | | | |
|---|---|---|---|---|
| 2010/0322197 | A1* | 12/2010 | Adjakple | H04B 7/155 |
| | | | | 370/332 |
| 2012/0243461 | A1* | 9/2012 | Bucknell | H04W 36/02 |
| | | | | 370/315 |
| 2015/0117357 | A1* | 4/2015 | Ozturk | H04W 28/0205 |
| | | | | 370/329 |
| 2016/0044518 | A1* | 2/2016 | Centonza | H04B 7/0408 |
| | | | | 370/328 |
| 2016/0044548 | A1* | 2/2016 | Choi | H04W 36/04 |
| | | | | 370/331 |
| 2016/0249259 | A1* | 8/2016 | Park | H04W 36/0069 |
| 2016/0353511 | A1* | 12/2016 | Gunnarsson | H04W 28/0268 |
| 2018/0035339 | A1* | 2/2018 | Mitsui | H04W 72/04 |
| 2019/0013902 | A1* | 1/2019 | Seo | H04L 1/08 |
| 2019/0104452 | A1* | 4/2019 | Park | H04W 36/185 |
| 2019/0253945 | A1* | 8/2019 | Paladugu | H04W 12/0433 |
| 2020/0022046 | A1* | 1/2020 | Wang | H04W 12/037 |
| 2020/0029251 | A1* | 1/2020 | Wu | H04W 36/0016 |
| 2020/0029260 | A1* | 1/2020 | Kadiri | H04W 36/026 |
| 2020/0068448 | A1* | 2/2020 | Byun | H04W 36/0009 |
| 2020/0107235 | A1* | 4/2020 | Peisa | H04W 74/02 |
| 2020/0187282 | A1* | 6/2020 | Yu | H04L 5/0055 |
| 2020/0252838 | A1* | 8/2020 | Akdeniz | H04W 36/0061 |
| 2020/0296645 | A1* | 9/2020 | Yang | H04W 36/0072 |
| 2021/0014924 | A1* | 1/2021 | Zheng | H04W 28/02 |
| 2021/0120429 | A1* | 4/2021 | Liu | H04L 5/001 |
| 2021/0204344 | A1* | 7/2021 | Babaei | H04W 80/02 |
| 2021/0250904 | A1* | 8/2021 | Liu | H04L 1/0075 |
| 2021/0345205 | A1* | 11/2021 | Persson | H04W 74/0833 |
| 2021/0400521 | A1* | 12/2021 | Fiorani | H04W 28/10 |
| 2022/0095187 | A1* | 3/2022 | Ohlsson | H04W 36/185 |
| 2022/0361053 | A1* | 11/2022 | Ohlsson | H04W 36/023 |
| 2023/0030653 | A1* | 2/2023 | Hori | H04W 36/0079 |
| 2023/0110505 | A1* | 4/2023 | Wang | H04L 1/08 |
| | | | | 370/331 |
| 2023/0156817 | A1* | 5/2023 | Wang | H04W 36/0079 |
| | | | | 370/329 |
| 2024/0205760 | A1* | 6/2024 | Huang | H04W 36/0055 |
| 2024/0349334 | A1* | 10/2024 | Babaei | H04W 74/0808 |
| 2024/0397357 | A1* | 11/2024 | Wang | H04W 36/033 |

FOREIGN PATENT DOCUMENTS

| | | |
|---|---|---|
| EP | 3697041 A1 | 8/2020 |
| WO | 2019096145 A1 | 5/2019 |
| WO | 2020089851 A1 | 5/2020 |

OTHER PUBLICATIONS

Qualcomm Inc., "PDCP Status Reporting for DAPS DRBs," 3GPP TSG-RAN WG2 Meeting #109bis-e, E-meeting: Apr. 20-30, 2020, R2-2002608, 10 pages.
3GPP TR 22.863 V14.1.0 (Sep. 2016), 3rd Generation Partnership Project; Technical Specification Group Services and System Aspects; Feasibility Study on New Services and Markets Technology Enablers—Enhanced Mobile Broadband; Stage 1 (Release 14), 21 pages.
3GPP TS 38.300 V16.1.0 (Mar. 2020), 3rd Generation Partnership Project; Technical Specification Group Radio Access Network; NR; NR and NG-RAN Overall Description; Stage 2 (Release 16), 133 pages.
3GPP TS 38.473 V16.1.0 (Mar. 2020), 3rd Generation Partnership Project; Technical Specification Group Radio Access Network; NG-RAN; F1 application protocol (F1AP) (Release 16), 240 pages.
3GPP TS 38.331 V16.0.0 (Mar. 2020), 3rd Generation Partnership Project; Technical Specification Group Radio Access Network; NR; Radio Resource Control (RRC) protocol specification (Release 16), 835 pages.
3GPP TS 38.413 V16.0.0 (Dec. 2019), 3rd Generation Partnership Project; Technical Specification Group Radio Access Network; NG-RAN; NG Application Protocol (NGAP) (Release 16), 335 pages.
3GPP TS 38.423 V16.0.0 (Dec. 2019), 3rd Generation Partnership Project; Technical Specification Group Radio Access Network; NG-RAN; Xn application protocol (XnAP) (Release 16), 330 pages.
3GPP TS 38.463 V16.1.1 (Apr. 2020), 3rd Generation Partnership Project; Technical Specification Group Radio Access Network; NG-RAN; E1 Application Protocol (E1AP) (Release 16), 191 pages.
3GPP TS 23.501 V16.4.0 (Mar. 2020), 3rd Generation Partnership Project; Technical Specification Group Services and System Aspects; System architecture for the 5G System (5GS); Stage 2 (Release 16), 430 pages.

* cited by examiner

COMMUNICATION METHOD AND APPARATUS

CROSS-REFERENCE TO RELATED APPLICATIONS

This application is a continuation of International Application No. PCT/CN2021/093585, filed on May 13, 2021, which claims priority to Chinese Patent Application No. 202010469461.9, filed on May 28, 2020. The disclosures of the aforementioned applications are hereby incorporated by reference in their entireties.

TECHNICAL FIELD

This application relates to the field of communication technologies, and in particular, to a communication method and apparatus.

BACKGROUND

In the 3rd generation partnership project (3GPP), indicators of 1 millisecond (ms) of latency and 99.999% of reliability are required on a user plane for air interfaces of ultra-reliable and low latency communication (URLLC) services.

To avoid impact brought by occasional communication errors at a network layer on an application layer, survival time may be set at an application layer of the URLLC service. Survival time means that, if the application layer does not receive a data packet within a time range in which the data packet is expected to arrive, the application layer starts a survival time timer. If an expected data packet arrives at the application layer during running of the timer, the timer stops. If the timer runs until the timer expires, to be specific, if no expected data packet arrives at the application layer during a time period in which the survival time timer runs, interruption occurs at the application layer, affecting services. Therefore, how to avoid service interruption of a terminal device at the application layer needs further research.

SUMMARY

This application provides a communication method and apparatus, to avoid service interruption at an application layer.

According to a first aspect, embodiments of this application provide a communication method. The method is applied to a first communication apparatus, and the first communication apparatus may be a target network device of a terminal device or a chip in the target network device. For example, the method is applicable to the target network device of the terminal device. In the method, the target network device may receive N data packets of a first service and auxiliary information from a source network device of the terminal device. The auxiliary information indicates a transmission status of at least one data packet before the N data packets. The target network device determines the transmission status of the at least one data packet based on the auxiliary information. N is a positive integer.

In the foregoing solution, the source network device sends the auxiliary information to the target network device, so that the target network device can obtain the transmission status of the at least one downlink data packet in time, and determine whether to improve transmission reliability of the to-be-sent data packet (for example, a part of or all of the N data packets). This effectively avoids service interruption caused at an application layer because the target network device cannot obtain the transmission status of the at least one downlink data packet in time due to handover of the terminal device.

In a possible design, the auxiliary information includes an identifier of a data packet before the N data packets that is unsuccessfully transmitted; or the auxiliary information includes an identifier of the 1st data packet before the N data packets that is unsuccessfully transmitted, and transmission status information of M data packets after the 1st data packet that is unsuccessfully transmitted, where the last data packet of the M data packets is adjacent to the 1st data packet of the N data packets, and M is a positive integer.

In a possible design, the auxiliary information further indicates a correspondence between the data packet and a transmission period.

In this solution, the target network device may determine the correspondence between the data packet and the transmission period based on the auxiliary information, to determine a quantity of consecutive transmission periods in which transmission is unsuccessful.

In a possible design, the auxiliary information includes an identifier of a data packet included in at least one transmission period; or the auxiliary information includes an identifier of the 1st data packet or the last data packet included in each transmission period of at least one transmission period, and a quantity of data packets or an amount of data included in the transmission period.

In a possible design, the method further includes: receiving, from the source network device, data information that is allowed to be unsuccessfully transmitted, where the data information that is allowed to be unsuccessfully transmitted is determined based on survival time of the first service.

In a possible design, the data information that is allowed to be unsuccessfully transmitted includes a maximum quantity of consecutive data packets that are allowed to be unsuccessfully transmitted and/or a maximum quantity of consecutive transmission periods in which transmission is allowed to be unsuccessful. The transmission period in which transmission is unsuccessful is a transmission period in which there is a data packet unsuccessfully transmitted, a transmission period in which a quantity of data packets unsuccessfully transmitted is greater than or equal to a first threshold, or a transmission period in which an amount of data unsuccessfully transmitted is greater than or equal to a second threshold.

According to a second aspect, embodiments of this application provide a communication method. The method is applied to a second communication apparatus, and the second communication apparatus may be a source network device of a terminal device or a chip in the source network device. For example, the method is applicable to the source network device of the terminal device. In the method, the source network device determines auxiliary information, and sends N data packets of a first service and the auxiliary information to a target network device of the terminal device. The auxiliary information indicates a transmission status of at least one data packet before the N data packets. N is a positive integer.

In a possible design, the auxiliary information includes an identifier of a data packet before the N data packets that is unsuccessfully transmitted; or the auxiliary information includes an identifier of the 1st data packet before the N data packets that is unsuccessfully transmitted, and transmission status information of M data packets after the 1st data packet that is unsuccessfully transmitted, where the last data packet of the M data packets is adjacent to the 1st data packet of the N data packets, and M is a positive integer.

In a possible design, the auxiliary information further indicates a correspondence between the data packet and a transmission period.

In a possible design, the auxiliary information includes an identifier of a data packet included in at least one transmission period; or the auxiliary information includes an identifier of the 1st data packet or the last data packet included in each transmission period of at least one transmission period, and a quantity of data packets or an amount of data included in the transmission period.

In a possible design, the method further includes: sending, to the target network device, data information that is allowed to be unsuccessfully transmitted, where the data information that is allowed to be unsuccessfully transmitted is determined based on survival time of the first service.

In a possible design, the data information that is allowed to be unsuccessfully transmitted includes a maximum quantity of consecutive data packets that are allowed to be unsuccessfully transmitted and/or a maximum quantity of consecutive transmission periods in which transmission is allowed to be unsuccessful. The transmission period in which transmission is unsuccessful is a transmission period in which there is a data packet unsuccessfully transmitted, a transmission period in which a quantity of data packets unsuccessfully transmitted is greater than or equal to a first threshold, or a transmission period in which an amount of data unsuccessfully transmitted is greater than or equal to a second threshold.

It should be noted that the method provided in the second aspect corresponds to the method provided in the first aspect. For beneficial effects of related technical features in the method provided in the second aspect, refer to descriptions of the first aspect. Details are not described again.

According to a third aspect, embodiments of this application provide a communication method. The method is applied to a first communication apparatus, and the first communication apparatus may be a target network device of a terminal device or a chip in the target network device. For example, the method is applicable to the target network device of the terminal device. In the method, the target network device receives N data packets of a first service and auxiliary information from a source network device of the terminal device. The auxiliary information indicates that P data packets are not allowed to fail to be transmitted. The target network device determines, based on the auxiliary information, that the P data packets are not allowed to fail to be transmitted. N and P are positive integers.

In this solution, after the target network device determines that the P data packets are not allowed to fail to be transmitted, transmission reliability of the P downlink data packets can be improved, to avoid that the P downlink data packets fail to be transmitted, and further avoid service interruption at an application layer. In other words, the source network device may determine the data packet that is not allowed to fail to be transmitted, and further indicate the data packet to the target network device, so that the target network device can directly learn of, in time based on the auxiliary information, the data packet that is not allowed to fail to be transmitted, to effectively reduce processing burden of the target network device.

In a possible design, the auxiliary information includes identifiers of the P data packets.

In a possible design, the method further includes: receiving, from the source network device, data information that is allowed to be unsuccessfully transmitted, where the data information that is allowed to be unsuccessfully transmitted is determined based on survival time of the first service.

In a possible design, the data information that is allowed to be unsuccessfully transmitted includes a maximum quantity of consecutive data packets that are allowed to be unsuccessfully transmitted and/or a maximum quantity of consecutive transmission periods in which transmission is allowed to be unsuccessful. The transmission period in which transmission is unsuccessful is a transmission period in which there is a data packet unsuccessfully transmitted, a transmission period in which a quantity of data packets unsuccessfully transmitted is greater than or equal to a first threshold, or a transmission period in which an amount of data unsuccessfully transmitted is greater than or equal to a second threshold.

According to a fourth aspect, embodiments of this application provide a communication method. The method is applied to a second communication apparatus, and the second communication apparatus may be a source network device of a terminal device or a chip in the source network device. For example, the method is applicable to the source network device of the terminal device. In the method, the source network device determines auxiliary information, and sends N data packets of a first service and the auxiliary information to a target network device of the terminal device. The auxiliary information indicates that the P data packets are not allowed to fail to be transmitted. N and P are positive integers.

In a possible design, the auxiliary information includes identifiers of the P data packets.

In a possible design, the method further includes: sending, to the target network device, data information that is allowed to be unsuccessfully transmitted, where the data information that is allowed to be unsuccessfully transmitted is determined based on survival time of the first service.

In a possible design, the data information that is allowed to be unsuccessfully transmitted includes a maximum quantity of consecutive data packets that are allowed to be unsuccessfully transmitted and/or a maximum quantity of consecutive transmission periods in which transmission is allowed to be unsuccessful. The transmission period in which transmission is unsuccessful is a transmission period in which there is a data packet unsuccessfully transmitted, a transmission period in which a quantity of data packets unsuccessfully transmitted is greater than or equal to a first threshold, or a transmission period in which an amount of data unsuccessfully transmitted is greater than or equal to a second threshold.

It should be noted that the method provided in the fourth aspect corresponds to the method provided in the third aspect. For beneficial effects of related technical features in the method provided in the fourth aspect, refer to descriptions of the third aspect. Details are not described again.

According to a fifth aspect, embodiments of this application provide a communication method. The method is applied to a first communication apparatus, and the first communication apparatus may be a target network device of a terminal device or a chip in the target network device. For example, the method is applicable to the target network device of the terminal device. In the method, the target network device receives N data packets of a first service and auxiliary information from a source network device of the terminal device. The auxiliary information indicates a status of a survival time timer of the first service. The target network device determines the status of the survival time timer based on the auxiliary information. N is a positive integer.

According to the foregoing solution, the source network device sends the auxiliary information to the target network device, so that the target network device can determine, based on the status of the survival time timer, whether to improve transmission reliability of the to-be-sent data packet, to effectively avoid service interruption caused at an application layer due to handover of the terminal device.

In a possible design, the auxiliary information includes at least one of the following: status information of the survival time timer; time information that a data packet for triggering the survival time timer arrives at the source network device; or an identifier of a data packet for triggering the survival time timer.

In a possible design, the method further includes: receiving, from the source network device, data information that is allowed to be unsuccessfully transmitted, where the data information that is allowed to be unsuccessfully transmitted is determined based on survival time of the first service.

In a possible design, the data information that is allowed to be unsuccessfully transmitted includes a maximum quantity of consecutive data packets that are allowed to be unsuccessfully transmitted and/or a maximum quantity of consecutive transmission periods in which transmission is allowed to be unsuccessful. The transmission period in which transmission is unsuccessful is a transmission period in which there is a data packet unsuccessfully transmitted, a transmission period in which a quantity of data packets unsuccessfully transmitted is greater than or equal to a first threshold, or a transmission period in which an amount of data unsuccessfully transmitted is greater than or equal to a second threshold.

According to a sixth aspect, embodiments of this application provide a communication method. The method is applied to a second communication apparatus, and the second communication apparatus may be a source network device of a terminal device or a chip in the source network device. For example, the method is applicable to the source network device of the terminal device. In the method, the source network device determines auxiliary information, and sends N data packets of a first service and the auxiliary information to a target network device of the terminal device. The auxiliary information indicates a status of a survival time timer of the first service. N is a positive integer.

In a possible design, the auxiliary information includes at least one of the following: status information of the survival time timer; time information that a data packet for triggering the survival time timer arrives at the source network device; or an identifier of a data packet for triggering the survival time timer.

In a possible design, the method further includes: sending, to the target network device, data information that is allowed to be unsuccessfully transmitted, where the data information that is allowed to be unsuccessfully transmitted is determined based on survival time of the first service.

In a possible design, the data information that is allowed to be unsuccessfully transmitted includes a maximum quantity of consecutive data packets that are allowed to be unsuccessfully transmitted and/or a maximum quantity of consecutive transmission periods in which transmission is allowed to be unsuccessful. The transmission period in which transmission is unsuccessful is a transmission period in which there is a data packet unsuccessfully transmitted, a transmission period in which a quantity of data packets unsuccessfully transmitted is greater than or equal to a first threshold, or a transmission period in which an amount of data unsuccessfully transmitted is greater than or equal to a second threshold.

It should be noted that the method provided in the sixth aspect corresponds to the method provided in the fifth aspect. For beneficial effects of related technical features in the method provided in the sixth aspect, refer to descriptions of the fifth aspect. Details are not described again.

According to a seventh aspect, embodiments of this application provide a communication method. The method is applied to a first communication apparatus, and the first communication apparatus may be a target network device of a terminal device or a chip in the target network device. For example, the method is applicable to the target network device of the terminal device. In the method, the target network device receives N data packets of a first service and auxiliary information from a source network device of the terminal device. The auxiliary information indicates a quantity of consecutive data packets that are unsuccessfully transmitted or a quantity of consecutive transmission periods in which transmission is unsuccessful. The last data packet of the consecutive data packets that are unsuccessfully transmitted is adjacent to the 1st data packet of the N data packets, and a data packet included in a next adjacent transmission period of the consecutive transmission periods in which the transmission is unsuccessful belongs to the N data packet. The quantity of the consecutive data packets that are unsuccessfully transmitted or the quantity of the consecutive transmission periods in which the transmission is unsuccessful is determined based on the auxiliary information. N is a positive integer.

According to the foregoing solution, the source network device sends the auxiliary information to the target network device, so that the target network device can determine whether to improve transmission reliability of the to-be-sent data packet, to effectively avoid service interruption caused at an application layer due to handover of the terminal device.

In a possible design, the method further includes: receiving, from the source network device, data information that is allowed to be unsuccessfully transmitted, where the data information that is allowed to be unsuccessfully transmitted is determined based on survival time of the first service.

In a possible design, the data information that is allowed to be unsuccessfully transmitted includes a maximum quantity of consecutive data packets that are allowed to be unsuccessfully transmitted and/or a maximum quantity of consecutive transmission periods in which transmission is allowed to be unsuccessful. The transmission period in which transmission is unsuccessful is a transmission period in which there is a data packet unsuccessfully transmitted, a transmission period in which a quantity of data packets unsuccessfully transmitted is greater than or equal to a first threshold, or a transmission period in which an amount of data unsuccessfully transmitted is greater than or equal to a second threshold.

According to an eighth aspect, embodiments of this application provide a communication method. The method is applied to a second communication apparatus, and the second communication apparatus may be a source network device of a terminal device or a chip in the source network device. For example, the method is applicable to the source network device of the terminal device. In the method, the source network device determines auxiliary information, and sends N data packets of a first service and the auxiliary information to a target network device of the terminal device. The auxiliary information indicates a quantity of consecutive data packets that are unsuccessfully transmitted or a quantity of consecutive transmission periods in which transmission is unsuccessful. The last data packet of the consecutive data packets that are unsuccessfully transmitted is adjacent to the 1st data packet of the N data packets, and the last data packet of the last transmission period of the consecutive transmission periods in which the transmission is unsuccessful is adjacent to the 1st data packet of the N data packets.

In a possible design, the method further includes: sending, to the target network device, data information that is allowed to be unsuccessfully transmitted, where the data information that is allowed to be unsuccessfully transmitted is determined based on survival time of the first service.

In a possible design, the data information that is allowed to be unsuccessfully transmitted includes a maximum quantity of consecutive data packets that are allowed to be unsuccessfully transmitted and/or a maximum quantity of consecutive transmission periods in which transmission is allowed to be unsuccessful. The transmission period in which transmission is unsuccessful is a transmission period in which there is a data packet unsuccessfully transmitted, a transmission period in which a quantity of data packets unsuccessfully transmitted is greater than or equal to a first threshold, or a transmission period in which an amount of data unsuccessfully transmitted is greater than or equal to a second threshold.

It should be noted that the method provided in the eighth aspect corresponds to the method provided in the seventh aspect. For beneficial effects of related technical features in the method provided in the eighth aspect, refer to descriptions of the seventh aspect. Details are not described again.

According to a ninth aspect, this application provides a communication apparatus. The communication apparatus may be a target network device of a terminal device or a chip in the target network device. The communication apparatus has functions for implementing the first aspect, the third aspect, the fifth aspect, or the seventh aspect. For example, the communication apparatus includes a corresponding module, unit, or means for performing the steps in the first aspect, the third aspect, the fifth aspect, or the seventh aspect. The functions, unit, or means may be implemented by software, may be implemented by hardware, or may be implemented by hardware executing corresponding software.

In a possible design, the communication apparatus includes a processing unit and a communication unit. The communication unit may be configured to send and receive a signal, to implement communication between the communication apparatus and another apparatus. For example, the communication unit is configured to receive configuration information from a network device. The processing unit may be configured to perform some internal operations of the communication apparatus. Functions performed by the processing unit and the communication unit may correspond to the steps in the first aspect, the third aspect, the fifth aspect, or the seventh aspect.

In a possible design, the communication apparatus includes a processor, and may further include a transceiver. The transceiver is configured to send and receive a signal, and the processor executes program instructions to implement the method in any one of the possible designs or implementations of the first aspect, the third aspect, the fifth aspect, or the seventh aspect. The communication apparatus may further include one or more memories. The memory is coupled to the processor. The one or more memories may be integrated with the processor, or may be disposed independent of the processor. This is not limited in this application. The memory may store a computer program or instructions necessary for implementing the functions in the first aspect, the third aspect, the fifth aspect, or the seventh aspect. The processor may execute the computer program or instructions stored in the memory. When the computer program or the instructions is/are executed, the communication apparatus is enabled to implement the method in any one of the possible designs or implementations of the first aspect, the third aspect, the fifth aspect, or the seventh aspect.

In a possible design, the communication apparatus includes a processor and a memory. The memory may store a computer program or instructions necessary for implementing the functions in the first aspect, the third aspect, the fifth aspect, or the seventh aspect. The processor may execute the computer program or instructions stored in the memory. When the computer program or the instructions is/are executed, the communication apparatus is enabled to implement the method in any one of the possible designs or implementations of the first aspect, the third aspect, the fifth aspect, or the seventh aspect.

In a possible design, the communication apparatus includes at least one processor and an interface circuit. The at least one processor is configured to communicate with another apparatus through the interface circuit, and perform the method in any one of the possible designs or implementations of the first aspect, the third aspect, the fifth aspect, or the seventh aspect.

According to a tenth aspect, this application provides a communication apparatus. The communication apparatus may be a source network device of a terminal device or a chip in the source network device. The communication apparatus has functions for implementing the second aspect, the fourth aspect, the sixth aspect, or the eighth aspect. For example, the communication apparatus includes a corresponding module, unit, or means (means) for performing the steps in the second aspect, the fourth aspect, the sixth aspect, or the eighth aspect. The functions, unit, or means may be implemented by software, may be implemented by hardware, or may be implemented by hardware executing corresponding software.

In a possible design, the communication apparatus includes a processing unit and a communication unit. The communication unit may be configured to send and receive a signal, to implement communication between the communication apparatus and another apparatus. For example, the communication unit is configured to receive configuration information from a network device. The processing unit may be configured to perform some internal operations of the communication apparatus. Functions performed by the processing unit and the communication unit may correspond to the steps in the second aspect, the fourth aspect, the sixth aspect, or the eighth aspect.

In a possible design, the communication apparatus includes a processor, and may further include a transceiver. The transceiver is configured to send and receive a signal, and the processor executes program instructions to implement the method in any one of the possible designs or implementations of the second aspect, the fourth aspect, the sixth aspect, or the eighth aspect. The communication apparatus may further include one or more memories. The memory is coupled to the processor. The one or more memories may be integrated with the processor, or may be disposed independent of the processor. This is not limited in this application. The memory may store a computer program or instructions necessary for implementing the functions in the second aspect, the fourth aspect, the sixth aspect, or the eighth aspect. The processor may execute the computer program or instructions stored in the memory. When the computer program or the instructions is/are executed, the communication apparatus is enabled to implement the method in any one of the possible designs or implementations of the second aspect, the fourth aspect, the sixth aspect, or the eighth aspect.

In a possible design, the communication apparatus includes a processor and a memory. The memory may store a computer program or instructions necessary for implementing the functions in the second aspect, the fourth aspect, the sixth aspect, or the eighth aspect. The processor may execute the computer program or instructions stored in the memory. When the computer program or the instructions is/are executed, the communication apparatus is enabled to implement the method in any one of the possible designs or implementations of the second aspect, the fourth aspect, the sixth aspect, or the eighth aspect.

In a possible design, the communication apparatus includes at least one processor and an interface circuit. The at least one processor is configured to communicate with another apparatus through the interface circuit, and perform the method in any one of the possible designs or implementations of the second aspect, the fourth aspect, the sixth aspect, or the eighth aspect.

According to an eleventh aspect, this application provides a communication system. The communication system includes a first network device and a second network device. The first network device is configured to perform the method in any possible design of the first aspect, the third aspect, the fifth aspect, or the seventh aspect. The second network device is configured to perform the method in any possible design of the second aspect, the fourth aspect, the sixth aspect, or the eighth aspect. In an example, the communication system may further include a terminal device, the first network device may be a source network device of the terminal device, and the second network device may be a target network device of the terminal device.

According to a twelfth aspect, this application provides a computer-readable storage medium, and the computer-readable storage medium stores computer-readable instructions. When a computer reads and executes the computer-readable instructions, the computer is enabled to perform the method in any possible design of the first aspect to the eighth aspect.

According to a thirteenth aspect, this application provides a computer program product. When a computer reads and executes the computer program product, the computer is enabled to perform the method in any possible design of the first aspect to the eighth aspect.

According to a fourteenth aspect, this application provides a chip. The chip includes a processor. The processor is coupled to a memory, and is configured to read and execute a software program stored in the memory, to implement the method in any possible design of the first aspect to the eighth aspect.

DETAILED DESCRIPTION OF ILLUSTRATIVE EMBODIMENTS

The following clearly and completely describes the technical solutions in embodiments of this application with reference to the accompanying drawings in embodiments of this application.

Figure 1:
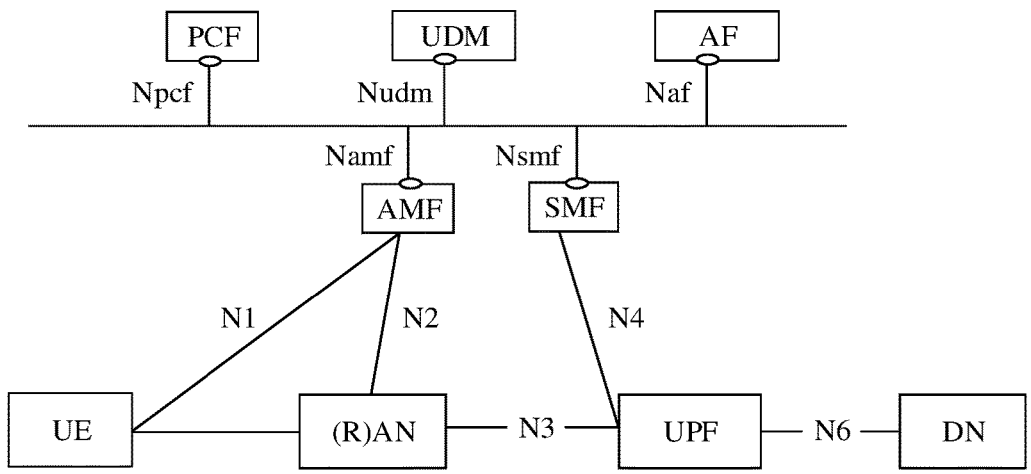
FIG. 1 is a schematic diagram of a network architecture to which an embodiment of this application is applicable.

FIG. 1 is a schematic diagram of a network architecture to which an embodiment of this application is applicable. As shown in FIG. 1, a terminal device may access a wireless network, to access services of external networks (for example, a data network (DN)) through the wireless network, or communicate with other devices through the wireless network, for example, communicate with another terminal device. The wireless network includes a radio access network (RAN) and a core network (CN). The RAN is used to connect the terminal device to the wireless network, and the CN is used to manage the terminal device and provide a gateway for communication with the DN.

The following separately describes in detail the terminal device, the RAN, the CN, and the DN in FIG. 1.

1. Terminal Device

The terminal device is a device providing users with voice and/or data connectivity, for example, a handheld device having a wireless connection function, or a processing device connected to a wireless modem. The terminal device may communicate with a core network via a radio access network (RAN), and exchange voice and/or data with the RAN. The terminal device may be user equipment (UE), a wireless terminal device, a mobile terminal device, a device-to-device (D2D) terminal device, a vehicle-to-everything (V2X) terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user equipment, or the like. For example, the terminal device may be a mobile phone (or referred to as a "cellular" phone), a computer having a mobile terminal device, a portable, pocket-sized, handheld, or computer built-in mobile apparatus, or the like. For example, the terminal device may be a device such as a personal communications service (PCS) phone, a cordless telephone set, a session initiation protocol (SIP) phone, a wireless local loop (WLL) station, or a personal digital assistant (PDA). The terminal device is alternatively a limited device, for example, a device having low power consumption, a device having a limited storage capability, or a device having a limited computing capability. For example, the terminal device is an information sensing device such as a barcode, radio frequency identification (RFID), a sensor, a global positioning system (GPS), or a laser scanner.

2. RAN

The RAN may include one or more RAN devices, and an interface between the RAN device and the terminal device may be a Uu interface (or referred to as an air interface). Certainly, in future communication, names of these interfaces may still be used, or may be replaced with other names. This is not limited in this application.

The RAN device is a node or a device that enables the terminal device to access the radio network. The RAN device may also be referred to as a network device or a base station. The RAN device includes, for example, but is not limited to, a next-generation NodeB (gNB), an evolved NodeB (eNB), a radio network controller (RNC), a NodeB (NB), a base station controller (BSC), a base transceiver station (BTS), a home base station ((home evolved NodeB, HeNB) or (home NodeB, HNB)), a baseband unit (BBU), a transmission reception point (TRP), a transmission point (TP), and a mobile switching center in a 5G communication system.

(i) Protocol Layer Structure

Communication between the RAN device and the terminal device is performed in accordance with a specific protocol layer structure. For example, a control plane protocol layer structure may include a radio resource control (RRC) layer, a packet data convergence protocol (PDCP) layer, a radio link control (RLC) layer, a media access control (MAC) layer, and a physical layer. A user plane protocol layer structure may include a PDCP layer, an RLC layer, a MAC layer, and a physical layer. In possible implementation, a service data adaptation protocol (SDAP) layer may be further included above the PDCP layer.

Data transmission between the network device and the terminal device is used as an example. Data transmission needs to go through the user plane protocol layer such as the SDAP layer, the PDCP layer, the RLC layer, the MAC layer, and the physical layer. The SDAP layer, the PDCP layer, the RLC layer, the MAC layer, and the physical layer are also collectively referred to as an access stratum. For example, at least one data radio bearer (DRB) is established between the network device and the terminal device for data transmission. Each DRB may correspond to a group of functional entity sets, for example, include one PDCP layer entity, at least one RLC layer entity corresponding to the PDCP layer entity, at least one MAC layer entity corresponding to the at least one RLC layer entity, and at least one physical layer entity corresponding to the at least one MAC layer entity. It should be noted that at least one signaling radio bearer (SRB) may also be established between the network device and the terminal device for signaling transmission. The DRB and the SRB are collectively referred to as a radio bearer (RB).

Figure 2A:
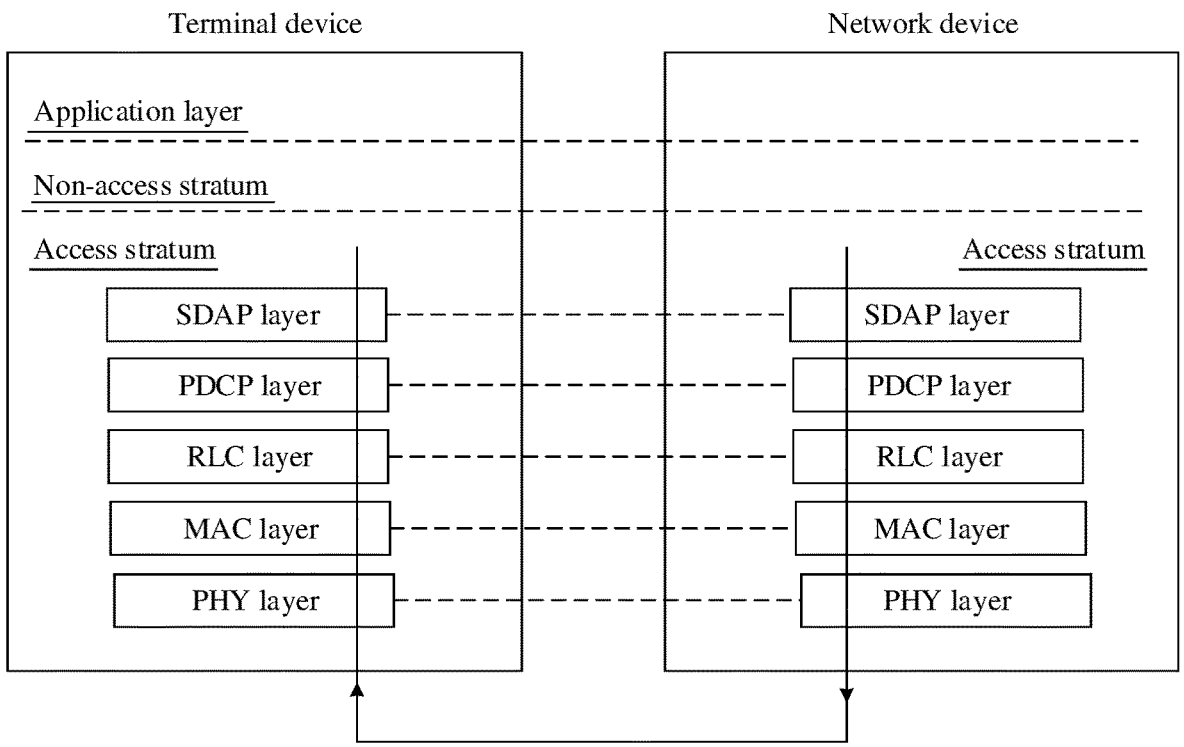
FIG. 2A is a diagram of an example of a protocol layer structure between a terminal device and a network device according to an embodiment of this application.

Downlink data transmission is used as an example. FIG. 2A is a schematic diagram of downlink data transmission between layers. In FIG. 2A, a downward arrow represents data sending, and an upward arrow represents data receiving. After obtaining data from an upper layer, the SDAP layer entity may map the data to a PDCP layer entity of a corresponding DRB based on a quality of service flow indicator (QFI) of the data. The PDCP layer entity may transmit the data to at least one RLC layer entity corresponding to the PDCP layer entity, and then the at least one RLC layer entity transmits the data to a corresponding MAC layer entity. Then, the MAC layer entity generates a transport block, and a corresponding physical layer entity wirelessly transmits the transport block. The data is correspondingly encapsulated at each layer. Data received by a layer from an upper layer of the layer is considered as a service data unit (SDU) of the layer. After being encapsulated at the layer, the data becomes a protocol data unit (PDU), and is then transferred to a next layer. For example, data received by the PDCP layer entity from an upper layer is referred to as a PDCP SDU, and data sent by the PDCP layer entity to a lower layer is referred to as a PDCP PDU. Data received by the RLC layer entity from an upper layer is referred to as an RLC SDU, and data sent by the RLC layer entity to a lower layer is referred to as an RLC PDU. Data may be transmitted between different layers through a corresponding channel. For example, data may be transmitted between the RLC layer entity and the MAC layer entity through a logical channel (LCH), and data may be transmitted between the MAC layer entity and the physical layer entity through a transport channel.

For example, it can be further learned from FIG. 2A that, the terminal device further has an application layer and a non-access stratum. The application layer may be configured to provide a service for an application program installed on the terminal device. For example, downlink data received by the terminal device may be sequentially transmitted from the physical layer to the application layer, and then is provided by the application layer for the application program. For another example, the application layer may obtain data generated by the application program, sequentially transmit the data to the physical layer, and send the data to another communication apparatus. The non-access stratum may be configured to forward user data. For example, the non-access stratum forwards uplink data received from the application layer to the SDAP layer, or forwards downlink data received from the SDAP layer to the application layer.

(2) CU and DU

Figure 2B:
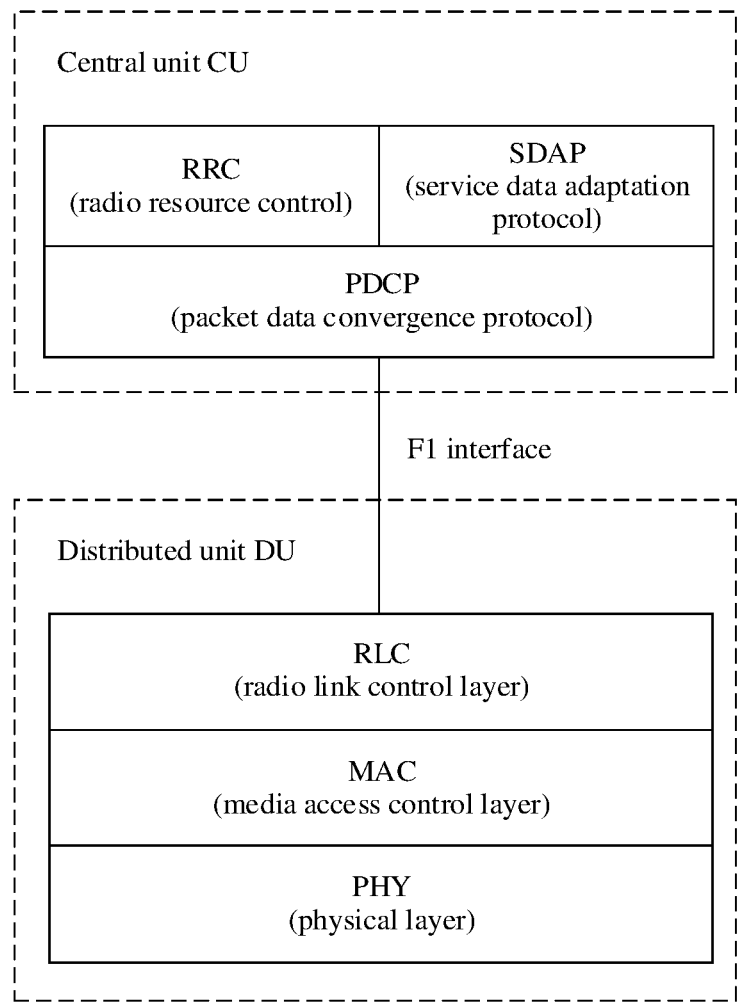
FIG. 2B is a schematic diagram of a CU-DU split architecture according to an embodiment of this application.

In embodiments of this application, the RAN device may include one or more central units (central units, CUs) and one or more distributed units (DUs), and a plurality of DUs may be centrally controlled by one CU. For example, an interface between the CU and the DU may be referred to as an F1 interface. A control plane (CP) interface may be an F1-C interface, and a user plane (UP) interface may be an F1-U interface. Division may be performed for the CU and the DU based on protocol layers of a wireless network. For example, as shown in FIG. 2B, functions of a PDCP layer and protocol layers above the PDCP layer are set on the CU, and functions of protocol layers (for example, an RLC layer and a MAC layer) below the PDCP layer are set on the DU.

It may be understood that division of processing functions of the CU and the DU based on the protocol layers is merely an example, and the processing functions of the CU and the DU may alternatively be divided in another manner. For example, the functions of the protocol layers above the PDCP layer are set on the CU, and the functions of the PDCP layer and the protocol layers below the PDCP layer are set on the DU. For another example, the CU or the DU may have functions of more protocol layers. For another example, the CU or the DU may have some processing functions of a protocol layer. In a design, some functions of the RLC layer and functions of protocol layers above the RLC layer are set on the CU, and remaining functions of the RLC layer and functions of protocol layers below the RLC layer are set on the DU. In another design, division of functions of the CU or the DU may be performed based on service types or other system requirements. For example, division may be performed based on latencies. Functions whose processing time needs to satisfy a latency requirement are set on the DU, and functions whose processing time does not need to satisfy the latency requirement are set on the CU. In another design, the CU may alternatively have one or more functions of a core network. For example, the CU may be set on a network side for ease of centralized management; and the DU may have a plurality of radio frequency functions, or the radio frequency functions may be set remotely. This is not limited in embodiments of this application.

Figure 2C:
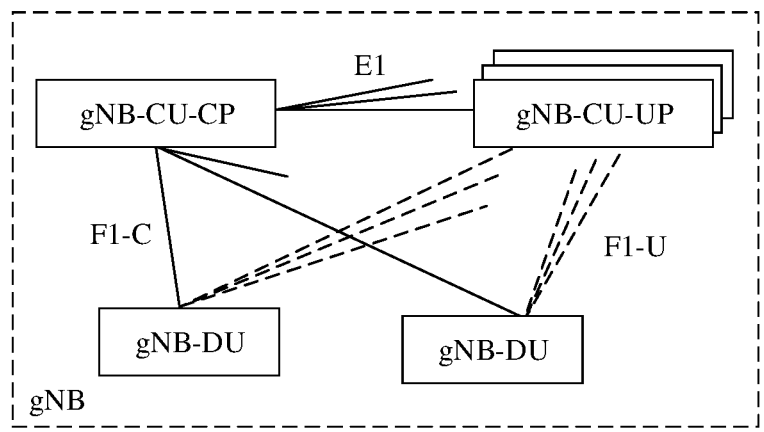
FIG. 2C is another schematic diagram of a CU-DU split architecture according to an embodiment of this application.

For example, the functions of the CU may be implemented by one entity or different entities. For example, as shown in FIG. 2C, functions of a CU may be further divided, that is, a control plane and a user plane are separated, and are implemented by using different entities: a control plane CU entity (namely, a CU-CP entity) and a user plane CU entity (namely, a CU-UP entity). The CU-CP entity and the CU-UP entity may be coupled to a DU, to jointly complete a function of a RAN device. An interface between the CU-CP entity and the CU-UP entity may be an E1 interface, an interface between the CU-CP entity and the DU may be an F1-C interface, and an interface between the CU-UP entity and the DU may be an F1-U interface. One DU and one CU-UP may be connected to one CU-CP. Under control of a same CU-CP, one DU may be connected to a plurality of CU-UPs, and one CU-UP may be connected to a plurality of DUs.

Figure 2D:
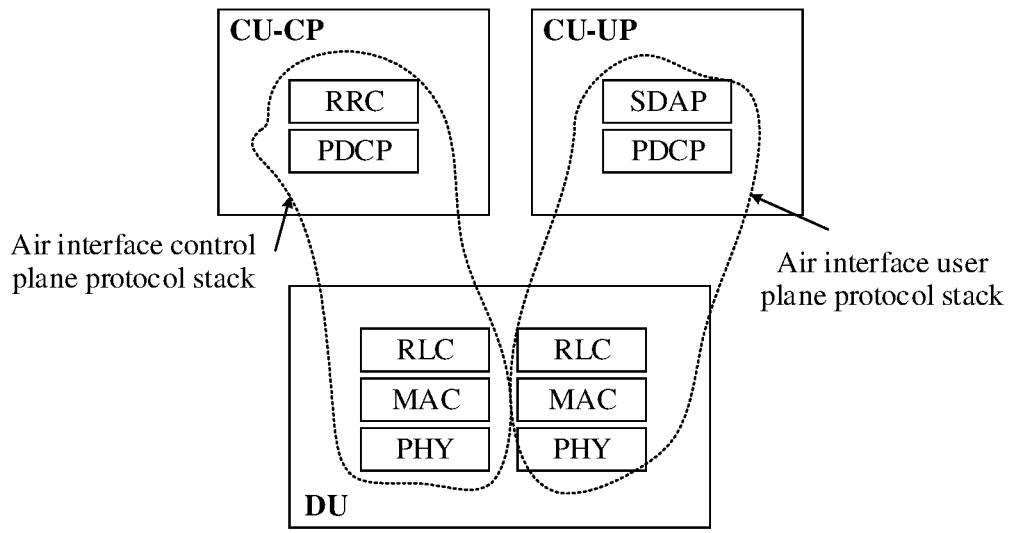
FIG. 2D is a schematic diagram of distribution of air interface protocol stacks according to an embodiment of this application.

Based on FIG. 2C, FIG. 2D is a schematic diagram of distribution of air interface protocol stacks. As shown in FIG. 2D, for both a user plane and a control plane, the air interface protocol stack may be that an RLC layer, a MAC layer, and a PHY layer are on a DU, and a PDCP layer and protocol layers above the PDCP layer are on a CU.

It should be noted that in the architectures shown in FIG. 2B to FIG. 2D, signaling generated by the CU may be sent to the terminal device via the DU, or signaling generated by the terminal device may be sent to the CU via the DU. The DU may transparently transmit the signaling to the terminal device or the CU by directly encapsulating the signaling at a protocol layer without parsing the signaling. In the following embodiments, if transmission of the signaling between the DU and the terminal device is described, sending or receiving the signaling by the DU is applicable to the scenario. For example, signaling of an RRC layer or a PDCP layer is finally processed as signaling of a physical layer and sent to the terminal device, or signaling of an RRC layer or a PDCP layer is converted from received signaling of a physical layer. In this architecture, the signaling of the RRC or the PDCP layer may also be considered to be sent by the DU, or sent by the DU and a radio frequency apparatus.

3. CN

The CN may include one or more CN devices. Using a 5G communication system as an example, the CN may include an access and mobility management function (AMF) network element, a session management function (SMF) network element, a user plane function (UPF) network element, a policy control function (PCF) network element, a unified data management (UDM) network element, an application function (AF) network element, and the like.

In addition, although not shown, the CN may further include other possible network elements, for example, a network exposure function (NEF) network element or a unified data repository (UDR) network element.

4. DN

The DN, also be referred to as a packet data network (PDN), is a network located outside a carrier network. The carrier network may access a plurality of DNs. Application servers corresponding to a plurality of services may be deployed in the DN, to provide a plurality of possible services for the terminal device. An application layer corresponding to an application layer of the terminal device may be disposed in the application server.

In FIG. 1, Npcf, Nudm, Naf, Namf, Nsmf, N1, N2, N3, N4, and N6 are interface sequence numbers. For meanings of these interface sequence numbers, refer to related standard protocols. This is not limited herein.

It may be understood that a 5G communication system is used as an example in FIG. 1. The solutions in embodiments of this application may alternatively be applicable to another possible communication system, for example, a future 6th generation (6G) communication system. The foregoing network elements or functions may be network elements in a hardware device, may be software functions run on dedicated hardware, or may be instantiated virtualization functions on a platform (for example, a cloud platform). Optionally, the foregoing network elements or the functions may be implemented by one device, may be jointly implemented by a plurality of devices, or may be implemented by one functional module in one device. This is not specifically limited in embodiments of this application.

Based on the communication system shown in FIG. 1, the following explains and describes related technical features in embodiments of this application. It should be noted that these explanations are intended to make embodiments of this application easier to understand, but should not be considered as a limitation on the protection scope claimed in this application.

1. Mode of an RLC Layer

As described above, the RLC layer is located above the MAC layer. Based on different service types, there are three modes at the RLC layer: a transparent mode (TM), an unacknowledged mode (UM), and an acknowledged mode (AM).

If the TM mode is used at the RLC layer, the RLC layer entity provides only a data transparent transmission function, instead of segmenting or concatenating an SDU delivered to the RLC layer entity.

If the UM mode is used for the RLC layer entity, after sending an RLC PDU, the RLC layer entity neither needs to wait an acknowledgment from a peer entity nor retransmits the RLC PDU. To be specific, after a data packet is transmitted through the UM RLC layer entity, it is considered that the transmission ends. Even if the data packet is lost during the transmission at an air interface, the RLC layer entity does not retransmit the data packet. The UM may be usually used for latency-sensitive services requiring medium reliability. For example, data transmitted in the UM mode may be non-critical signaling such as periodically reported measurement reports, periodically transmitted service data, or the like.

If the AM mode is used for the RLC layer entity, the RLC layer entity may use an automatic repeat request (ARQ) mechanism to ensure lossless data transmission. A basic idea of ARQ is that a data receiver side (receiver side for short) may send an RLC status report to a data transmitter side, to indicate which data packets are successfully received and which data packets are unsuccessfully received, and the transmitter side may retransmit, based on the RLC status report, the data packets that are unsuccessfully transmitted. The AM may be usually used for reliability-sensitive services, and therefore data loss needs to be maximally avoided during transmission for this type of services.

In embodiments of this application, data in uplink transmission or downlink transmission may be periodically transmitted service data packets. Therefore, the following provides descriptions by using an example in which the UM mode is used for uplink transmission or downlink transmission. For example, downlink transmission is used as an example. When the UM mode is used, a network device sends a data packet 1 to a terminal device, and the network device no longer retransmits the data packet 1 even if the data packet 1 fails to be transmitted.

2. Survival Time

The 5G communication system may support a plurality of possible services, for example, a URLLC service. For the URLLC service, to avoid impact brought by occasional communication errors at a network layer on an application layer, survival time may be set at the application layer of the URLLC service. Survival time means that, if the application layer does not receive a data packet within a time range in which the data packet is expected to arrive, the application layer starts a survival time timer. If an expected data packet arrives at the application layer during running of the timer, the timer stops. If the timer runs until the timer expires, to be specific, if no expected data packet arrives at the application layer during a time period in which the survival time timer runs, interruption occurs at the application layer.

Figure 3A:
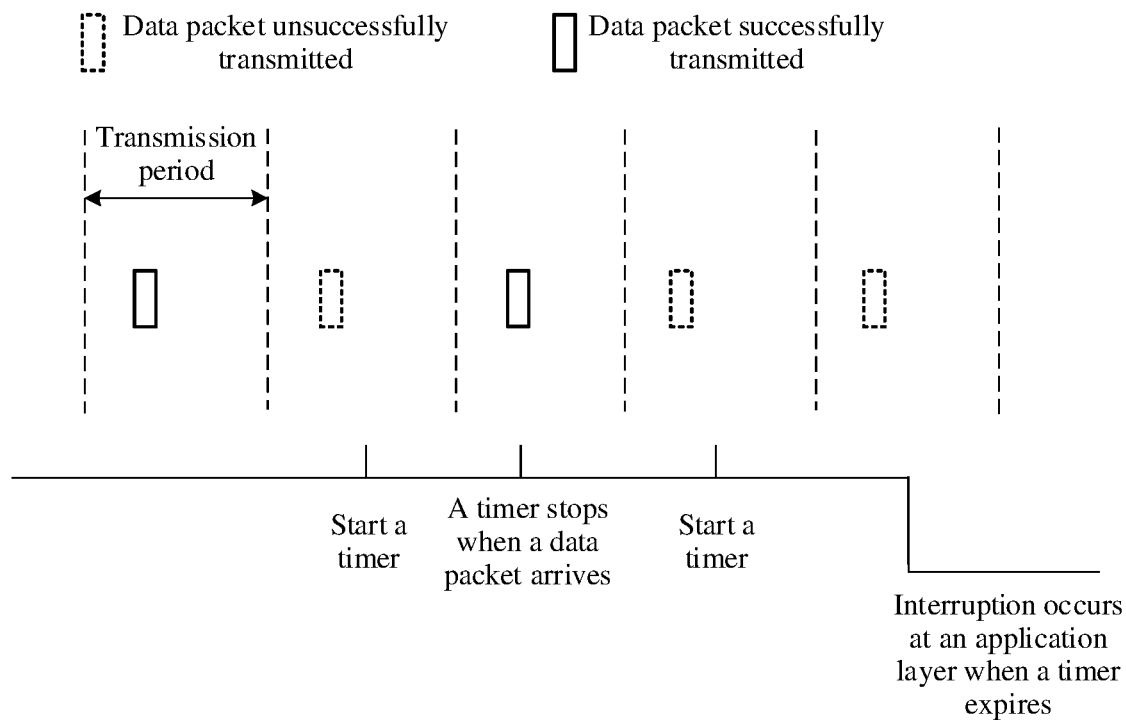
FIG. 3A shows an example of service interruption at an application layer according to an embodiment of this application.

For a service in which a data packet is periodically generated, in an example, the survival time may be defined as a quantity (for example, a) of consecutive data packets that are unsuccessfully transmitted. If the quantity of the consecutive data packets that are unsuccessfully transmitted is greater than or equal to a, service interruption occurs at the application layer. For example, referring to FIG. 3A, one data packet may be transmitted in one transmission period, and a is 2. In other words, when two consecutive data packets are unsuccessfully transmitted, service interruption occurs at an application layer.

For this example, to avoid service interruption at the application layer, a possible implementation is as follows: Using a first service as an example, a core network device may determine, based on survival time of the first service, a maximum quantity of consecutive data packets that are allowed to be unsuccessfully transmitted. For example, a quantity of consecutive data packets that are unsuccessfully transmitted is a and a is defined based on the survival time of the first service, and the core network device may determine that the maximum quantity of consecutive data packets that are allowed to be unsuccessfully transmitted is b, where a is greater than b. For example, a=2, b=1; or a=3, and b=1 or 2. Further, the core network device may send, to a network device, the maximum quantity (for example, b) of the consecutive data packets that are allowed to be unsuccessfully transmitted. Correspondingly, downlink transmission is used as an example. When the network device determines that the quantity of the consecutive data packets that are unsuccessfully transmitted is greater than or equal to b, transmission reliability of a next data packet can be improved, so that the terminal device can successfully receive the next data packet, to avoid service interruption at the application layer.

Figure 3B:
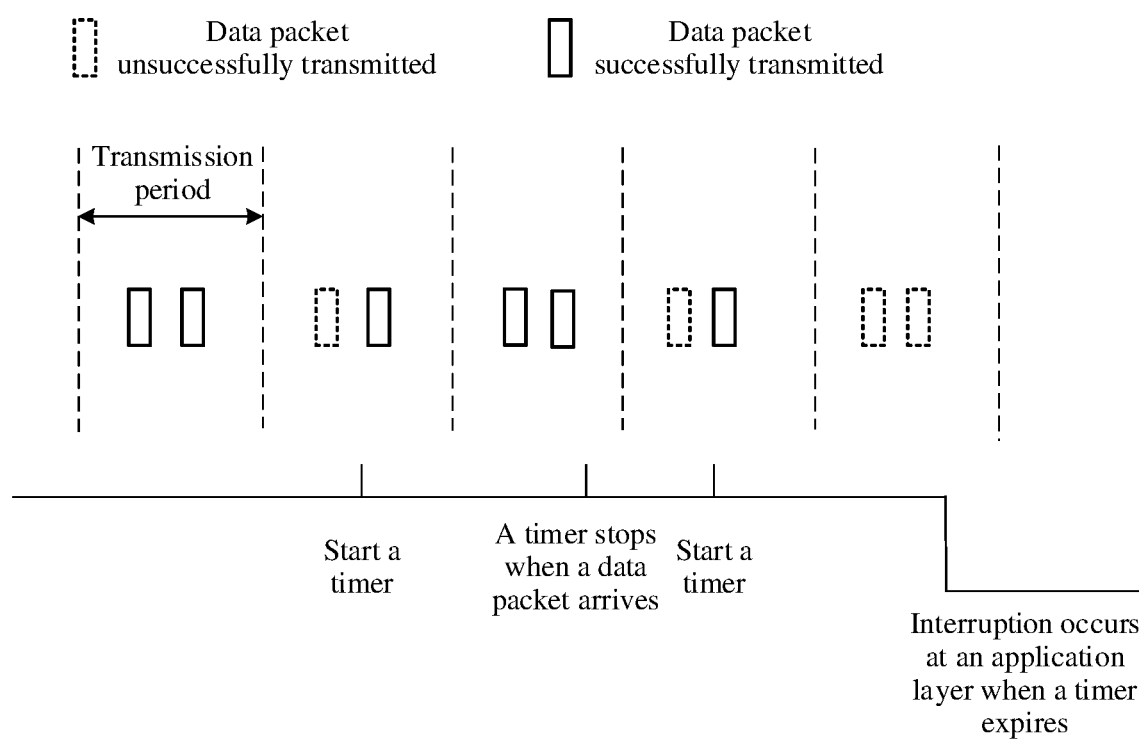
FIG. 3B shows another example of service interruption at an application layer according to an embodiment of this application.

In still another example, the survival time may be defined as a quantity (for example, c) of consecutive transmission periods in which transmission is unsuccessful. The transmission period in which transmission is unsuccessful may be a transmission period in which there is a data packet unsuccessfully transmitted, a transmission period in which a quantity of data packets unsuccessfully transmitted is greater than or equal to a first threshold, or a transmission period in which an amount of data unsuccessfully transmitted is greater than or equal to a second threshold. If the quantity of the consecutive transmission periods in which the transmission is unsuccessful is greater than or equal to c, service interruption occurs at the application layer. For example, referring to FIG. 3B, two data packets may be transmitted in one transmission period, the first threshold is 1, and c is 2. To be specific, when the quantity of the data packets that are unsuccessfully transmitted is greater than or equal to 1 in each transmission period of two consecutive transmission periods, service interruption occurs at the application layer.

For this example, to avoid service interruption at the application layer, a possible implementation is as follows: Using the first service as an example, the core network device may determine, based on the survival time of the first service, the maximum quantity of consecutive transmission periods in which the transmission is allowed to be unsuccessful. For example, the quantity of the consecutive transmission periods in which the transmission is unsuccessful is c, where c is defined based on the survival time of the first service, and the core network device may determine that the maximum quantity of consecutive data packets that are allowed to be unsuccessfully transmitted is d, where c is greater than d. For example, c=2, d=1; or c=3, and d=1 or 2. Further, the core network device may send, to the network device, the maximum quantity (for example, d) of consecutive transmission periods in which the transmission is allowed to be unsuccessful. Optionally, the core network device may further send the first threshold or the second threshold to the network device (where in another possible example, the first threshold and the second threshold may also be protocol-predefined). Correspondingly, downlink transmission is used as an example. When the network device determines that the quantity of consecutive transmission periods in which transmission is unsuccessful is greater than or equal to d, transmission reliability of a data packet in a next transmission period can be improved, so that the terminal device can successfully receive the data packet in the next transmission period, to avoid service interruption at the application layer.

It should be noted that downlink transmission is used as an example, and the foregoing data packet that is unsuccessfully transmitted may include:

(1) A data packet that is determined by a PDCP layer of the network device and that fails to be transmitted (that is, fails to be sent). The PDCP layer of the network device may determine that the data packet fails to be transmitted in a plurality of manners. For example, the PDCP layer of the network device processes the data packet to obtain a PDCP PDU, and delivers the PDCP PDU to an RLC layer. The RLC layer delivers the PDCP PDU to a MAC layer, the MAC layer delivers the PDCP PDU to a physical layer, and the physical layer sends the PDCP PDU to the terminal device. If the physical layer of the network device receives a NACK from the terminal device or does not receive an ACK within specified duration, the physical layer may determine that the data packet fails to be transmitted. Then, the physical layer notifies the MAC layer, the MAC layer notifies the RLC layer, and the RLC notifies the PDCP layer. For another example, when the network device includes a CU and a DU that are separate, the DU may periodically (for example, in each transmission period) send a sending status report of a data packet to the CU, and then a PDCP layer in the CU may determine, based on the sending status report, whether the data packet fails to be transmitted. Alternatively, the DU detects that data packets fail to be sent (for example, triggers a survival time timer of the downlink data packet) in consecutive transmission periods, and sends a sending status report of the data packet to the CU, and a PDCP layer in the CU may determine, based on the sending status report, whether the data packet fails to be transmitted. Alternatively, the CU requests the DU to report a sending status report of a data packet. Correspondingly, the DU sends the sending status report of the data packet to the CU, and then a PDCP layer in the CU may determine, based on the sending status report of the data packet, whether the data packet fails to be transmitted.

The sending status report may indicate one or more sending statuses (that is, sending succeeds or fails) of one or more PDCP PDUs corresponding to one or more PDCP sequence numbers (SNs). For example, if the plurality of PDCP PDUs are cascaded at the RLC layer, one transport block at the MAC layer may include the plurality of PDCP PDUs. If determining that one transport block is unsuccessfully transmitted, the MAC layer of the DU may indicate sending statuses of all PDCP PDUs in the transport block to the CU.

(2) A data packet discarded by a PDCP layer due to expiration of a discard timer (timer) at the PDCP layer. Specifically, after receiving one data packet (for example, a PDCP SDU), the PDCP layer of the network device starts the discard timer. After the expiration of the discard timer, the PDCP layer discards the data packet. In other words, even if the data packet has not been sent on an air interface, the PDCP layer still discards the data packet. In an example, duration of the discard timer may be 10 ms or 20 ms.

(3) A data packet that has not been successfully transmitted. For example, the data packet that has not been successfully transmitted may include a data packet that has been sent by the network device to the terminal device through an air interface but has not received an acknowledgment response (for example, an ACK) from the terminal device. In embodiments of this application, that the network device has sent the data packet to the terminal device through the air interface but has not received the acknowledgment response from the terminal device does not absolutely indicate that the data packet is unsuccessfully received by the terminal device, or that the data packet is unsuccessfully received by the terminal device subsequently. The data packet has been successfully received by the terminal device, but the terminal device has not sent an acknowledgment response to the network device. Alternatively, the data packet has been successfully received by the terminal device, and the terminal device sends an acknowledgment response to the network device, but the network device has not received the acknowledgment response. Alternatively, the data packet has not been successfully received by the terminal device currently, but the data packet is successfully received by the terminal device subsequently, and the terminal device sends, to the network device, an acknowledgment response corresponding to the data packet.

It should be noted that a difference between "having not received an ACK from the terminal device" described in (3) and "not receiving an ACK within specified duration" described in (1) lies in that: "having not received an ACK from the terminal device" means that the specified duration is not exceeded, and therefore the ACK from the terminal device may be received within the specified duration; and "not receiving an ACK within the specified duration" means that the specified duration is exceeded, and it is determined that no ACK is received within the specified duration.

It may be understood that downlink transmission is used as an example for description. For a case of uplink transmission, refer to descriptions related to the downlink transmission. Details are not described. In addition, an amount of data that is unsuccessfully transmitted in the foregoing descriptions may be an amount of data included in one or more data packets that are unsuccessfully transmitted.

3. Handover Procedure of a Terminal Device

Figure 4:
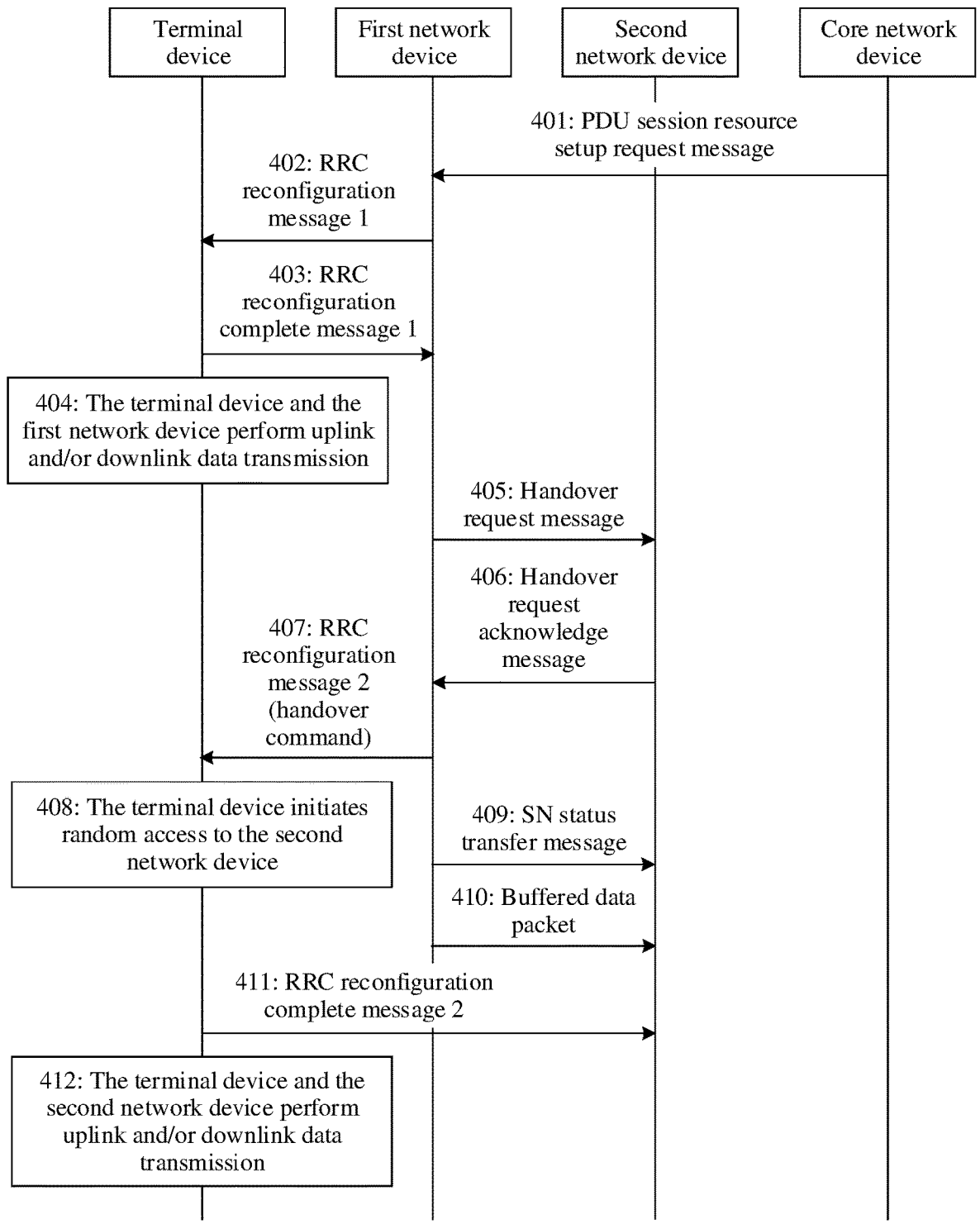
FIG. 4 is a schematic flowchart of a handover procedure according to an embodiment of this application.

As the terminal device moves, the terminal device may move from a coverage area of a source network device to a coverage area of a target network device. In this case, the terminal device may be handed over from the source network device to the target network device. A 5G communication system is used as an example. FIG. 4 is a schematic diagram of a possible handover procedure. As shown in FIG. 4, the procedure includes the following steps.

Step 401: A core network device sends a PDU session resource setup request message to a first network device, to request the first network device to set up a PDU session, where the PDU session may include a first quality of service (QoS) flow.

Herein, the PDU session resource setup request message may include a QoS parameter of the first QoS flow. For example, the first QoS flow is a guaranteed bit rate (GBR) QoS flow, and the QoS parameter of the first QoS flow may include a 5G quality of service identifier (5QI) and the like. For example, the PDU session resource setup request message may further include data information that is allowed to be unsuccessfully transmitted and characteristic information of a first service (where for details, refer to descriptions in Embodiment 1).

Step 402: The first network device determines configuration information of one or more DRBs or LCHs based on the QoS parameter of the first QoS flow, and sends an RRC reconfiguration message 1 to a terminal device. The RRC reconfiguration message 1 may include the configuration information of one or more DRBs or LCHs.

For example, considering that survival time of different services may be different, in this embodiment of this application, the first network device may map QoS flows of services having different survival time to different radio bearers. Therefore, for the services having different survival time, even if there is a same QoS level, the QoS flows are not multiplexed into one transport block, so that a network side detects a transmission status of a data packet of each service (for example, a quantity of consecutive data packets of each service that are unsuccessfully transmitted). For example, a QoS flow 1 is for carrying a service 1, a QoS flow 2 is for carrying a service 2, and survival time of the service 1 is different from survival time of the service 2. In this case, the first network device may map the QoS flow 1 and the QoS flow 2 to different radio bearers, to subsequently separately detect a transmission status of a data packet of the service 1 and a transmission status of a data packet of the service 2. This avoids interruption of the service 1 and the service 2 at an application layer.

Step 403: The terminal device performs corresponding configuration based on the RRC reconfiguration message 1, and sends an RRC reconfiguration complete message 1 to the first network device.

Step 404: The terminal device and the first network device perform uplink and/or downlink data transmission.

Step 405: The first network device sends a handover request message to a second network device. The handover request is for notifying the second network device that the terminal device is ready to be handed over to the second network device.

Herein, before sending the handover request message, the first network device may send measurement configuration information to the terminal device. Correspondingly, the terminal device may perform measurement based on the measurement configuration information sent by the first network device. When a trigger condition of a measurement report is satisfied, the terminal device may send the measurement report to the first network device. Further, the first network device makes a handover decision based on the measurement report sent by the terminal device. To be specific, the first network device may determine a target cell based on the measurement report sent by the terminal device, and determine to hand over the terminal device to the second network device (namely, a network device to which the target cell belongs).

Step 406: The second network device sends a handover request acknowledgment (handover request ack) message to the first network device.

For example, after receiving the handover request message sent by the first network device, the second network device may perform handover preparation based on the handover request message, and allocate a related configuration used for handing over the terminal device to the target cell. For example, the target cell allocates, to the terminal device, a cell radio network temporary identifier (C-RNTI) and a random access resource used for accessing the target cell by the terminal device. The handover request acknowledgment message may include the C-RNTI and the random access resource that are allocated by the target cell to the terminal device.

Step 407: The first network device sends an RRC reconfiguration message 2 including a handover command to the terminal device.

Herein, the handover command may include the C-RNTI allocated by the target cell to the terminal device, and random access resource information used by the terminal device to access the target cell.

Step 408: The terminal device initiates random access to the second network device based on the handover command.

Herein, the terminal device may disconnect an RRC connection to the first network device, or may maintain the RRC connection to the first network device. This is not specifically limited.

It should be noted that in some possible scenarios, the terminal device may send uplink data to the second network device in a random access process.

Step 409: The first network device sends an SN status transfer (SN status transfer) message to the second network device.

For downlink transmission, in an example, the SN status transfer message may include a DL PDCP SN, and a value of the DL PDCP SN indicates a start sequence number value used when the second network device allocates a PDCP SN to a downlink data packet to which no PDCP SN has not been allocated (that is, the second network device allocates the PDCP SN to the downlink data packet starting from the DL PDCP SN value). In this case, a PDCP SN allocated by the second network device to the downlink data packet and a PDCP SN allocated by the first network device to the downlink data packet may be consecutive. For example, if the last PDCP SN allocated by the first network device to downlink data packets is 100, the $1^{st}$ PDCP SN allocated by the second network device to the downlink data packets is 101. Alternatively, the SN status transfer message may include a first sequence number (to be specific, the second network device allocates the PDCP SN to the downlink data packet starting from the first sequence number). In other words, the first network device may indicate a new sequence number (the first sequence number) to the second network device. Alternatively, the SN status transfer message may not include the DL PDCP SN value or the first sequence number. In this case, the second network device may allocate the PDCP SN to the downlink data packet starting from a second sequence number. The second sequence number may be a default sequence number (for example, 0) or a protocol-predefined sequence number. This is not specifically limited. It may be understood that if the second network device allocates the PDCP SN to the downlink data packet starting from the first sequence number or the second sequence number, the PDCP SN allocated by the second network device to the downlink data packet and the PDCP SN allocated by the first network device to the downlink data packet may be inconsecutive.

For uplink transmission, in an example, the SN status transfer message may include a UL PDCP SN, and the UL PDCP SN indicates a PDCP SN of the $1^{st}$ uplink data packet that is unsuccessfully transmitted.

It should be noted that the SN status transfer message may alternatively be replaced with another message name, for example, an early forwarding transfer message. This is not specifically limited.

Step 410: The first network device forwards buffered data packet to the second network device.

For downlink transmission, in an example, the first network device may forward, to the second network device, a downlink data packet that has not been sent (including a downlink data packet that has not undergone PDCP processing and that is newly sent by a UPF network element to the first network device, and a downlink data packet that has undergone PDCP processing but has not been sent).

For uplink transmission, in an example, the first network device may forward, to the second network device, an out-of-order uplink data packet (starting from the $1^{st}$ out-of-order uplink data packet and another data packet (if any) after the $1^{st}$ out-of-order packet) received from the terminal device. Herein, "out-of-order" means that PDCP SNs of uplink data packets are inconsecutive because an uplink data packet fails to be transmitted. For example, the terminal device sends a data packet 1, a data packet 2, a data packet 3, and a data packet 4 to the first network device, but the first network device receives only the data packet 1, the data packet 3, and the data packet 4, and the data packet 2 fails to be transmitted. In this case, the first network device may forward the data packet 3 (namely, the $1^{st}$ out-of-order uplink data packet) and the data packet 4 to the second network device.

Step 411: The terminal device performs a random access procedure with the second network device, and after the random access procedure succeeds, the terminal device sends an RRC reconfiguration complete message 2 to the second network device, to indicate that the terminal device is successfully handed over to the second network device.

Step 412: The terminal device performs data transmission with the second network device.

It should be noted that in the foregoing handover procedure, the first network device is a source network device, and the second network device is a target network device. Only some possible steps are shown in the procedure described in step 401 to step 412. In specific implementation, another possible step may be further included. For example, after receiving the PDU session resource setup request message, the first network device may further return a PDU session resource setup response message to the core network device.

Based on the foregoing related technical features, in embodiments of this application, how to avoid service interruption at an application layer in a scenario in which a terminal device is handed over is mainly studied.

For example, for downlink transmission, the communication method provided in embodiments of this application may include: A source network device of a terminal device sends N data packets of a first service and auxiliary information (referred to as first auxiliary information in embodiments of this application for ease of differentiation) to a target network device. Correspondingly, the target network device may improve transmission reliability of one or more to-be-sent downlink data packets based on the first auxiliary information, to effectively avoid service interruption caused at an application layer due to handover of the terminal device. For uplink transmission, the communication method provided in embodiments of this application may include: A source network device of a terminal device sends auxiliary information (referred to as second auxiliary information in embodiments of this application for ease of differentiation) to a target network device. Correspondingly, the target network device may improve transmission reliability of one or more to-be-scheduled uplink data packets based on the second auxiliary information, to effectively avoid service interruption caused at an application layer due to handover of the terminal device.

It should be noted that the downlink transmission is used as an example. After the target network device receives the first auxiliary information from the source network device, a specific operation performed by the target network device based on the first auxiliary information may depend on internal implementation of the target network device. For example, the target network device may improve the transmission reliability of the one or more to-be-sent downlink data packets based on the first auxiliary information, or the target network device may perform another possible operation based on the first auxiliary information, to avoid service interruption caused at the application layer due to handover of the terminal device. In other words, in embodiments of this application, the source network device sends the first auxiliary information to the target network device, so that the target network device may perform a related operation based on or with reference to the first auxiliary information (where the specific operation may not be limited), to provide a possible idea for resolving the foregoing technical problem (namely, how to avoid service interruption caused at the application layer in a scenario in which the terminal device is handed over).

The following describes in detail a communication method provided in embodiments of this application with reference to Embodiment 1 to Embodiment 4.

Embodiment 1

Figure 5:
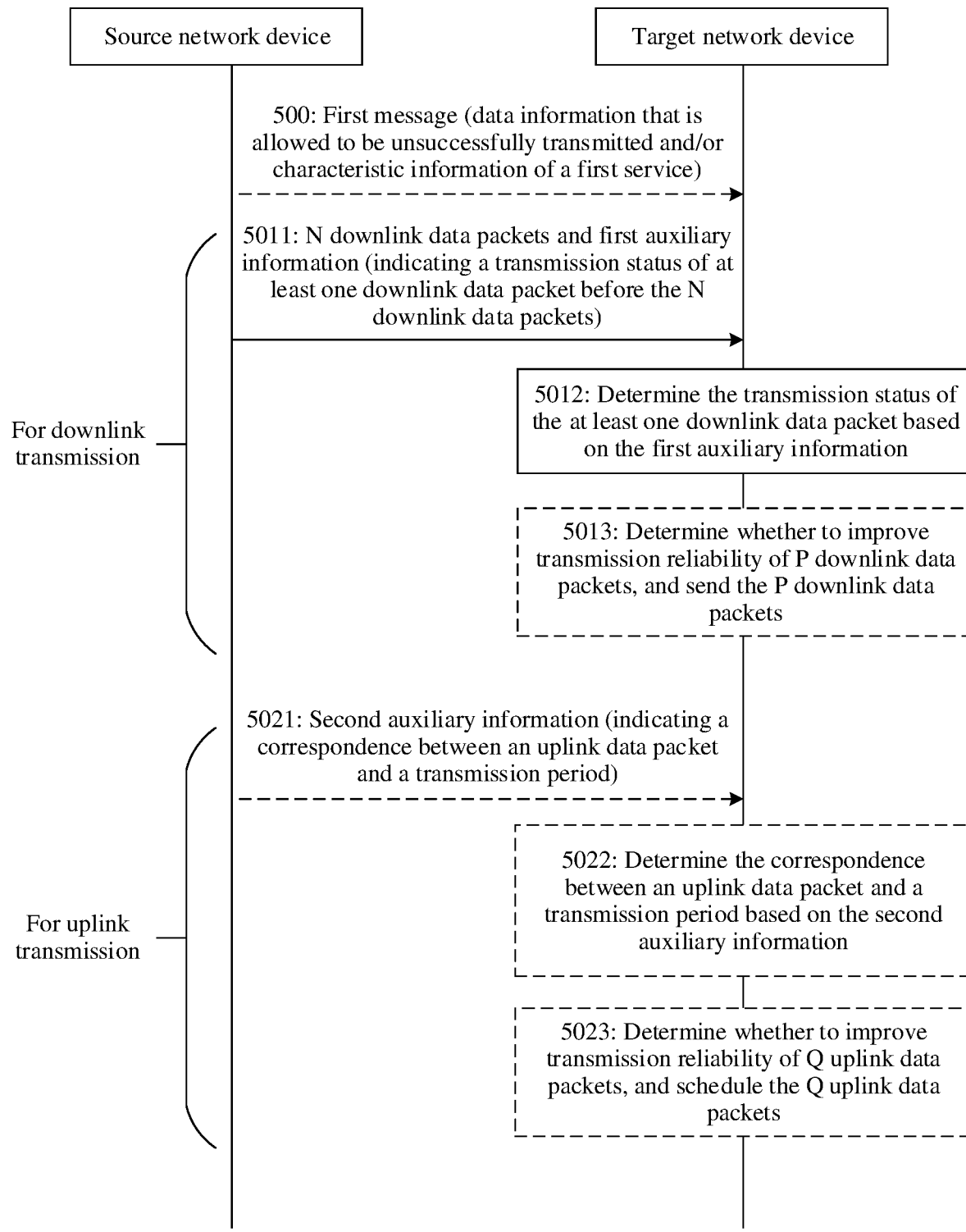
FIG. 5 is a schematic flowchart corresponding to a communication method according to Embodiment 1 of this application.

FIG. 5 is a schematic flowchart corresponding to a communication method according to Embodiment 1 of this application. As shown in FIG. 5, the method includes the following steps.

Step 500: A source network device sends a first message to a target network device, where the first message includes data information that is allowed to be unsuccessfully transmitted and/or characteristic information of a first service. Correspondingly, the target network device may receive the first message, and obtain the data information that is allowed to be unsuccessfully transmitted and the characteristic information of the first service.

For example, the first message may be a handover request message sent by the source network device to the target network device, or another possible message. This is not specifically limited.

(1) The data information that is allowed to be unsuccessfully transmitted may be determined based on survival time of the first service. For example, the data information that is allowed to be unsuccessfully transmitted may include a third threshold or a fourth threshold. The third threshold indicates a maximum quantity of consecutive data packets that are allowed to be unsuccessfully transmitted, and the fourth threshold indicates a maximum quantity of consecutive transmission periods in which transmission is unsuccessful.

It should be noted that the foregoing described data information that is allowed to be unsuccessfully transmitted is applied to both uplink transmission and downlink transmission unless otherwise specified. However, in specific implementation, this is applied to only uplink transmission, or is applied to only downlink transmission, or is applied to both uplink transmission and downlink transmission.

In addition, in this embodiment of this application, an example in which the data information that is allowed to be unsuccessfully transmitted may include the third threshold or the fourth threshold is used for description. In another possible embodiment, the data information that is allowed to be unsuccessfully transmitted may include other possible information, for example, a fifth threshold. The fifth threshold indicates a maximum amount of consecutive data that is allowed to be unsuccessfully transmitted.

(2) For downlink transmission, the characteristic information of the first service may include at least one of the following: duration of a transmission period of a downlink data packet, a quantity of downlink data packets arriving at the source network device in one transmission period (namely, the quantity of the downlink data packets included in the transmission period, or the quantity of the downlink data packets transmitted in the transmission period), an amount of data arriving at the source network device in one transmission period, and end time information that a downlink data packet in at least one transmission period arrives at the source network device, or start time information that a downlink data packet in at least one transmission period arrives at the source network device. The end time information that the downlink data packet in the transmission period arrives at the source network device may be time information that the last downlink data packet in the transmission period arrives at the source network device. The start time information that the downlink data packet in the transmission period arrives at the source network device may be time information that the $1^{st}$ downlink data packet in the transmission period arrives at the source network device. It may be understood that start time information that a downlink data packet in the $1^{st}$ transmission period of the first service arrives at the source network device is the start time information that the downlink data packet arrives at the source network device.

For uplink transmission, the characteristic information of the first service may include at least one of the following: duration of a transmission period of a uplink data packet, a quantity of uplink data packets arriving at a terminal device in one transmission period (namely, the quantity of the uplink data packets included in the transmission period, or the quantity of the uplink data packets transmitted in the transmission period), an amount of uplink data arriving at the terminal device in one transmission period, and end time information that a uplink data packet in at least one transmission period arrives at the terminal device, or start time information that a uplink data packet in the at least one transmission period arrives at the terminal device.

(3) In this embodiment of this application, the source network device may obtain the data information that is allowed to be unsuccessfully transmitted and the characteristic information of the first service in a plurality of manners. For example, the source network device receives a PDU session resource setup request message from a core network device, where the PDU session resource setup request message includes the data information that is allowed to be unsuccessfully transmitted and the characteristic information of the first service.

It should be noted that step 500 is an optional step.

Step 5011: The source network device sends N downlink data packets of the first service and first auxiliary information to the target network device, where the first auxiliary information may indicate a transmission status of at least one downlink data packet before the N downlink data packets.

Optionally, the first auxiliary information may further indicate a correspondence between a downlink data packet and a transmission period, and/or a quantity of downlink data packets arriving at the source network device in one transmission period.

It may be understood that, in step 500, if the characteristic information that is of the first service and that is sent by the source network device to the target network device includes the quantity of the downlink data packets arriving at the source network device in the transmission period (or other information that can be used for determining the quantity of the downlink data packets arriving at the source network device in the transmission period), the first auxiliary information may no longer indicate the quantity of the downlink data packets arriving at the source network device in the transmission period. Alternatively, if the first auxiliary information indicates the quantity of the downlink data packets arriving at the source network device in the transmission period, the characteristic information of the first service may no longer include the quantity of the downlink data packets arriving at the source network device in the transmission period (or other information that can determine the quantity of the downlink data packets arriving at the source network device in the transmission period), or the source network device may no longer send the characteristic information of the first service to the target network device.

Step 5012: The target network device receives the N downlink data packets and the first auxiliary information, and determines, based on the first auxiliary information, the transmission status of the at least one downlink data packet before the N downlink data packets.

The following provides descriptions of related technical features related to the first auxiliary information.

1. N Downlink Data Packets

The N downlink data packets may include downlink data packets that have not been sent by the source network device, and the source network device may send the N downlink data packets to the target network device (referring to step 410 shown in FIG. 4). For example, referring to FIG. 6, a data packet 1 to a data packet 6 are downlink data packets that have been sent by the source network device, the data packet 2 to the data packet 5 are all successfully transmitted, the data packet 1 and the data packet 6 are unsuccessfully transmitted, and a data packet 7 to a data packet 10 are downlink data packets that have not been sent. In this case, the N downlink data packets may include the data packet 7 to the data packet 10.

2. At Least One Data Packet Before the N Downlink Data Packets

Figure 6:
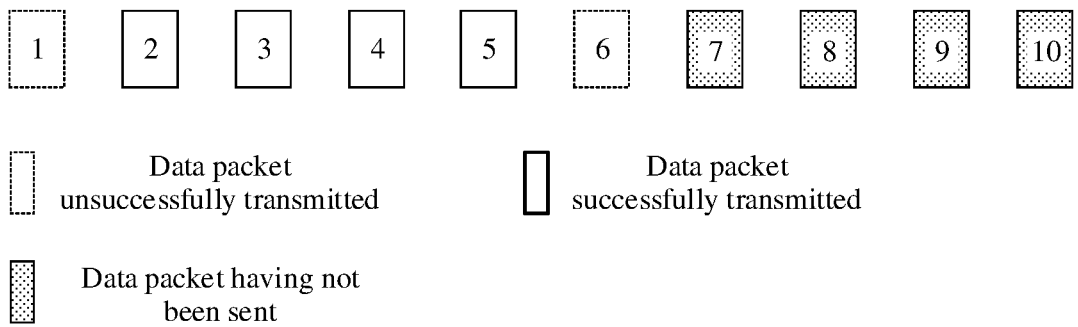
FIG. 6 is a schematic diagram of a plurality of downlink data packets according to an embodiment of this application.

The at least one data packet before the N downlink data packets may include a data packet that is successfully transmitted and/or a data packet that is unsuccessfully transmitted. For example, the at least one data packet before the N downlink data packets may be at least one of W downlink data packets before the N downlink data packets. The last downlink data packet of the W downlink data packets is adjacent to the $1^{st}$ downlink data packet of the N downlink data packets. Referring to FIG. 6, the $1^{st}$ downlink data packet of the N downlink data packets is the data packet 7, and an adjacent data packet before the data packet 7 is the data packet 6. Therefore, the last downlink data packet of the W downlink data packets is the data packet 6.

A value of W may be protocol-predefined, or may be flexibly set by the source network device. For example, W may be equal to a size of a PDCP window, and the size of the PDCP window may be equal to half of a maximum value of a PDCP SN. For another example, the source network device may set the value of W based on the data information that is allowed to be unsuccessfully transmitted. For example, if the data information that is allowed to be unsuccessfully transmitted includes the third threshold, W may be an integer greater than or equal to the third threshold. Further, to save a transmission resource, W may be equal to a first threshold. For example, if the third threshold is 2, W may be equal to 2. For another example, the data information that is allowed to be unsuccessfully transmitted includes the fourth threshold. Assuming that two data packets are transmitted in one transmission period, W may be an integer greater than or equal to twice the fourth threshold. For example, if the fourth threshold is 2, W may be equal to 4.

It should be noted that, in another possible example, the at least one data packet before the N downlink data packets may alternatively be at least one downlink data packet in a preset time period before the N downlink data packets, and the last data packet in the preset time period is adjacent to the $1^{st}$ data packet of the N data packets. Herein, duration of the preset time period may be protocol-predefined, or may be flexibly set by the source network device. For example, the duration of the preset time period may be determined based on a size of a PDCP window. For example, if one transmission period includes one data packet, and the size of the PDCP window is 1024, the duration of the preset time period may be equal to duration of 1024 transmission periods. In the following, an example in which the at least one data packet before the N downlink data packets is the at least one of the W downlink data packets before the N downlink data packets is used for description.

3. Possible Implementation in Which the First Auxiliary Information Indicates the Transmission Status of the at Least One Data Packet Before the N Downlink Data Packets.

The first auxiliary information may indicate the transmission status of the at least one data packet before the N downlink data packets in multiple implementations. The following describes two possible examples.

In an example, the first auxiliary information may include an identifier of the data packet before the N data packets that is unsuccessfully transmitted. For example, the first auxiliary information may include an identifier of a downlink data packet, of the W downlink data packets before the N data packets, that is unsuccessfully transmitted. Herein, the identifier of the downlink data packet may be a PDCP SN of the downlink data packet, may be a count value of the downlink data packet, or may be other information identifying the downlink data packet. The count value of the downlink data packet may be obtained based on the PDCP SN and a hyper frame number (HFN) of the downlink data packet. For example, referring to FIG. 6, assuming that W=6, the first auxiliary information may include PDCP SNs of the data packet 1 and the data packet 6. Correspondingly, the target network device may determine, based on the first auxiliary information, that transmission statuses of the data packet 1 and the data packet 6 are unsuccessful transmission, and that transmission statuses of the data packet 2 to the data packet 5 are successful transmission.

In still another example, the first auxiliary information may include an identifier of the $1^{st}$ downlink data packet before the N downlink data packets that is unsuccessfully transmitted, and transmission status information of M downlink data packets after the $1^{st}$ downlink data packet that is unsuccessfully transmitted, where the last downlink data packet of the M downlink data packets is adjacent to the $1^{st}$ downlink data packet of the N downlink data packets. The $1^{st}$ downlink data packet before the N downlink data packets that is unsuccessfully transmitted may be an identifier of the $1^{st}$ downlink data packet unsuccessfully transmitted that is of the W downlink data packets before the N downlink data packets, and the last downlink data packet of the M downlink data packets is the last downlink data packet of the W downlink data packets. For example, the transmission status information of the M downlink data packets may include a bitmap, the bitmap includes M bits, the M bits respectively correspond to the M downlink data packets, and a value of each bit indicates a transmission status of a downlink data packet corresponding to the bit. For example, if a value of a bit is 1, it indicates that a transmission status of a downlink data packet corresponding to the bit is successful transmission; if the value of the bit is 0, it indicates that the transmission status of the downlink data packet corresponding to the bit is unsuccessful transmission. For example, if a PDCP SN of the $1^{st}$ data packet of the W downlink data packets that is unsuccessfully transmitted is n, a value of the $m^{th}$ bit (from right to left) in the bitmap indicates a transmission status of a downlink data packet whose PDCP SN is (m+n) mod (1+a maximum value of the PDCP SN). Referring to FIG. 6, assuming that the $1^{st}$ downlink data packet of the W downlink data packets that is unsuccessfully transmitted is the data packet 1 (for example, the PDCP SN of the data packet 1 is 1), the first auxiliary information may include the PDCP SN of the data packet 1 and a bitmap (01111).

4. Possible Implementation in Which the First Auxiliary Information Indicates the Quantity of the Downlink Data Packets Arriving at the Source Network Device in the Transmission Period The first auxiliary information may indicate, in multiple implementations, the quantity of the downlink data packets arriving at the source network device in the transmission period. The following describes two possible examples.

In an example, the first auxiliary information may include the quantity of the downlink data packets arriving at the source network device in the transmission period.

In still another example, the first auxiliary information may include time information that a part of or all of the N downlink data packets arrive at the source network device.

In this way, the target network device may determine, based on the time information that a part of or all of the N downlink data packets arrive at the source network device, that one or more data packets whose time information that the data packets arrive at the source network device is close belong to a same transmission period, and further obtain the quantity of the downlink data packets arriving at the source network device in the transmission period (or an amount of downlink data arriving at the source network device in the transmission period). A criterion for determining that the time information is close is not limited in this embodiment of this application.

For example, the first auxiliary information includes the time information that the N downlink data packets arrive at the source network device. The time information that the N downlink data packets arrive at the source network device may be shown in Table 1 or Table 2.

TABLE 1

Example 1 of time information that N downlink data packets arrive at a source network device

| Time information 1 |
| Time information 2 |
| ... |
| Time information N |

In Table 1, the time information 1 indicates time information that the $1^{st}$ data packet of the N downlink data packets arrives at the source network device, the time information 2 indicates time information that the $2^{nd}$ data packet of the N downlink data packets arrives at the source network device, and the time information N indicates time information that the $N^{th}$ downlink data packet of the N downlink data packets arrives at the source network device. After receiving the information shown in Table 3, if determining that the time information 1 is close to the time information 2, but the time information 2 is not close to the time information 3, the target network device may determine that the $1^{st}$ data packet and the $2^{nd}$ data packet belong to a same transmission period.

TABLE 2

Example 2 of time information that N downlink data packets arrive at a source network device

| PDCP SN-1 (or a count value 1) | Time information 1 |
| PDCP SN-2 (or a count value 2) | Time information 2 |
| ... | ... |
| PDCP SN-N (or a count value N) | Time information N |

In Table 2, the first row indicates that time information that a downlink data packet whose PDCP SN is PDCP SN-1 arrives at the source network device is the time information 1, and the second row indicates that time information that a downlink data packet whose PDCP SN is PDCP SN-2 arrives at the source network device is the time information 2. By analogy, time information that a downlink data packet whose PDCP SN is PDCP SN-N arrives at the source network device is the time information N.

In still another example, the first auxiliary information may include time information that the last data packet in the at least one transmission period arrives at the source network device (namely, the end time information that the downlink data packet in the at least one transmission period arrives at the source network device), and time information that another data packet of the transmission period arrives at the source network device may no longer be indicated. In this case, the target network device may distinguish between end of a current transmission period and start of a next transmission period based on the end time information.

In still another example, the first auxiliary information may include time information that the $1^{st}$ data packet in the at least one transmission period arrives at the source network device (namely, the start time information that the downlink data packet in the at least one transmission period arrives at the source network device), and time information that another data packet of the transmission period arrives at the source network device may no longer be indicated. In this case, the target network device may distinguish between end of a previous transmission period and start of a current transmission period based on the start time information.

5. Possible Implementation in Which the First Auxiliary Information Indicates the Correspondence Between a Downlink Data Packet and a Transmission Period The first auxiliary information indicates the correspondence between a downlink data packet and a transmission period in multiple implementations. The following describes two possible examples.

In an example, the first auxiliary information may include an identifier of the downlink data packet included in the at least one transmission period. For example, the first auxiliary information includes identifiers of downlink data packets included in two transmission periods. Table 3 shows an example of identifiers of downlink data packets included in two transmission periods.

TABLE 3

Example of identifiers of downlink data packets
included in two transmission periods

| Identifier of a data packet 1 and identifier of a data packet 2 |
| Identifier of a data packet 3 and identifier of a data packet 4 |

In Table 3, the first row indicates that the data packet 1 and the data packet 2 belong to one transmission period, and the second row indicates that the data packet 3 and the data packet 4 belong to one transmission period. In this way, after receiving the information shown in Table 3, the target network device may determine that the data packet 1 and the data packet 2 belong to one transmission period, and the data packet 3 and the data packet 4 belong to one transmission period. By analogy, the target network device may further determine that a data packet 5 and a data packet 6 belong to one transmission period, a data packet 7 and a data packet 8 belong to one transmission period, and the like.

In still another example, the first auxiliary information may include an identifier of the $1^{st}$ downlink data packet or the last downlink data packet included in each transmission period of the at least one transmission period, and a quantity of downlink data packets included in the transmission period. For example, the quantity of the downlink data packets included in each transmission period is 2, and a PDCP SN of the $1^{st}$ data packet in the transmission period is 1. In this way, after receiving the first auxiliary information, the target network device may determine that a data packet 1 (where the PDCP SN is 1) and a data packet 2 belong to one transmission period, a data packet 3 and a data packet 4 belong to one transmission period, and so on.

Optionally, the method may further include step 5013: The target network device determines whether to improve transmission reliability of P downlink data packets, and sends the P downlink data packets. The P downlink data packets may be first P downlink data packets of the N downlink data packets.

For example, if determining that a preset condition is satisfied, the target network device determines that a transmission mode of the P downlink data packets is a second transmission mode, and sends the P downlink data packets in the second transmission mode; or if determining that a preset condition is not satisfied, the target network device determines that a transmission mode of the P downlink data packets is a first transmission mode, and sends the P downlink data packets in the first transmission mode. Herein, transmission reliability of the first transmission mode is different from that of the second transmission mode. For example, the transmission reliability of the second transmission mode is higher than the transmission reliability of the first transmission mode. Therefore, determining that the transmission mode of the P downlink data packets is the second transmission mode may also be understood as: improving the transmission reliability of the P downlink data packets; and determining that the transmission mode of the P downlink data packets is the first transmission mode may also be understood as: not improving the transmission reliability of the P downlink data packets. There may be a plurality of manners of improving the transmission reliability of the P downlink data packets, for example, reducing an MCS of a downlink scheduling resource, or increasing a sending priority of the P downlink data packets.

For example, if the data information that is allowed to be unsuccessfully transmitted includes the third threshold, the determining that a preset condition is satisfied may include: determining that there are K1 (where K1 is greater than or equal to the third threshold) consecutive downlink data packets that are unsuccessfully transmitted, and the last downlink data packet of the K1 downlink data packets is adjacent to the $1^{st}$ downlink data packet of the N downlink data packets. In this case, the P data packets may be the $1^{st}$ downlink data packet of the N downlink data packets, for example, the data packet 7 in FIG. 6.

If the data information that is allowed to be unsuccessfully transmitted includes the fourth threshold, the determining that a preset condition is satisfied includes: determining that there are K2 (where K2 is greater than or equal to the fourth threshold) consecutive transmission periods in which transmission is unsuccessful, where a downlink data packet included in a next adjacent transmission period of the K2 transmission periods belongs to the N downlink data packets. In this case, the P data packets may be the downlink data packet included in the next adjacent transmission period packet of the K2 transmission periods. For example, in FIG. 6, one transmission period includes two data packets. The data packet 1 and the data packet 2 belong to one transmission period (referred to as a transmission period 1). By analogy, the data packet 7 and the data packet 8 belong to one transmission period (referred to as a transmission period 4). Assuming that the K2 transmission periods include a transmission period 3 (namely, a transmission period to which the data packet 5 and the data packet 6 belong), the P data packets may be the data packet 7 and the data packet 8.

Step 5021: The source network device sends second auxiliary information to the target network device, where the second auxiliary information may indicate a correspondence between an uplink data packet and a transmission period.

Herein, the foregoing descriptions related to the first auxiliary information may be applied to a manner in which the second auxiliary information indicates the correspondence between an uplink data packet and a transmission period. For example, the second auxiliary information may include an identifier of an uplink data packet included in each transmission period of at least one transmission period. For another example, the second auxiliary information may include a quantity of uplink data packets arriving at the terminal device in one transmission period and an identifier of the 1$^{st}$ uplink data packet or the last uplink data packet in the transmission period.

Optionally, the second auxiliary information may further indicate a transmission status of at least one uplink data packet. The at least one uplink data packet may be at least one of Y uplink data packets, and the last uplink data packet of the Y uplink data packets may be the last uplink data packet received by the source network device. For a value of Y, refer to the foregoing descriptions about W. It should be noted that Y may be equal to W when a maximum value of a DL PDCP SN is the same as a maximum value of a UL PDCP SN. The foregoing descriptions related to the first auxiliary information may be applied to a manner in which the second auxiliary information indicates the transmission status of the at least one uplink data packet. For example, the second auxiliary information may include an identifier of the 1$^{st}$ uplink data packet of the Y uplink data packets that is unsuccessfully transmitted and transmission status information of another uplink data packet after the 1$^{st}$ uplink data packet that is unsuccessfully transmitted.

In another possible embodiment, the source network device may further send a receiving status report of the at least one uplink data packet to the target network device. In this case, the second auxiliary information no longer indicates the transmission status of the at least one uplink data packet.

Optionally, the second auxiliary information may further indicate a quantity of uplink data packets arriving at the source network device in one transmission period.

Step 5022: The target network device receives the second auxiliary information, and determines the correspondence between an uplink data packet and a transmission period based on the second auxiliary information.

Optionally, the method may further include step 5023: The target network device determines whether to improve transmission reliability of Q uplink data packets, and schedules the Q uplink data packets. The Q uplink data packets are uplink data packets to be sent by the terminal device to the target network device.

There may be a plurality of manners of improving the transmission reliability of the Q uplink data packets, for example, reducing an MCS of an uplink scheduling resource, or increasing a sending priority of the Q uplink data packets.

It should be noted that the foregoing described downlink transmission procedure (for example, step 5011 to step 5013) and uplink transmission procedure (for example, step 5011 to step 5023) may be separately implemented, or may be implemented in combination. When the procedures are implemented in combination, the source network device may send the first auxiliary information and the second auxiliary information to the target network device via a same message. For example, the source network device sends the first auxiliary information and the second auxiliary information to the target network device via an SN status transmission message (or another possible message in a handover process such as an early forwarding transmission message). Alternatively, the source network device may separately send the first auxiliary information and the second auxiliary information to the target network device via different messages. This is not specifically limited.

In the foregoing solution, the downlink transmission is used as an example. The source network device sends the first auxiliary information to the target network device, where the first auxiliary information may indicate the transmission status of the at least one downlink data packet before the N downlink data packets, so that the target network device obtains the transmission status of the at least one downlink data packet before the N downlink data packets in a timely manner, and determines, based on the transmission status of the at least one downlink data packet before the N downlink data packets, whether to improve the transmission reliability of the P data packets. This effectively avoids service interruption caused at an application layer because the target network device cannot obtain the transmission status of the at least one downlink data packet in time due to handover of the terminal device.

Embodiment 2

Figure 7:
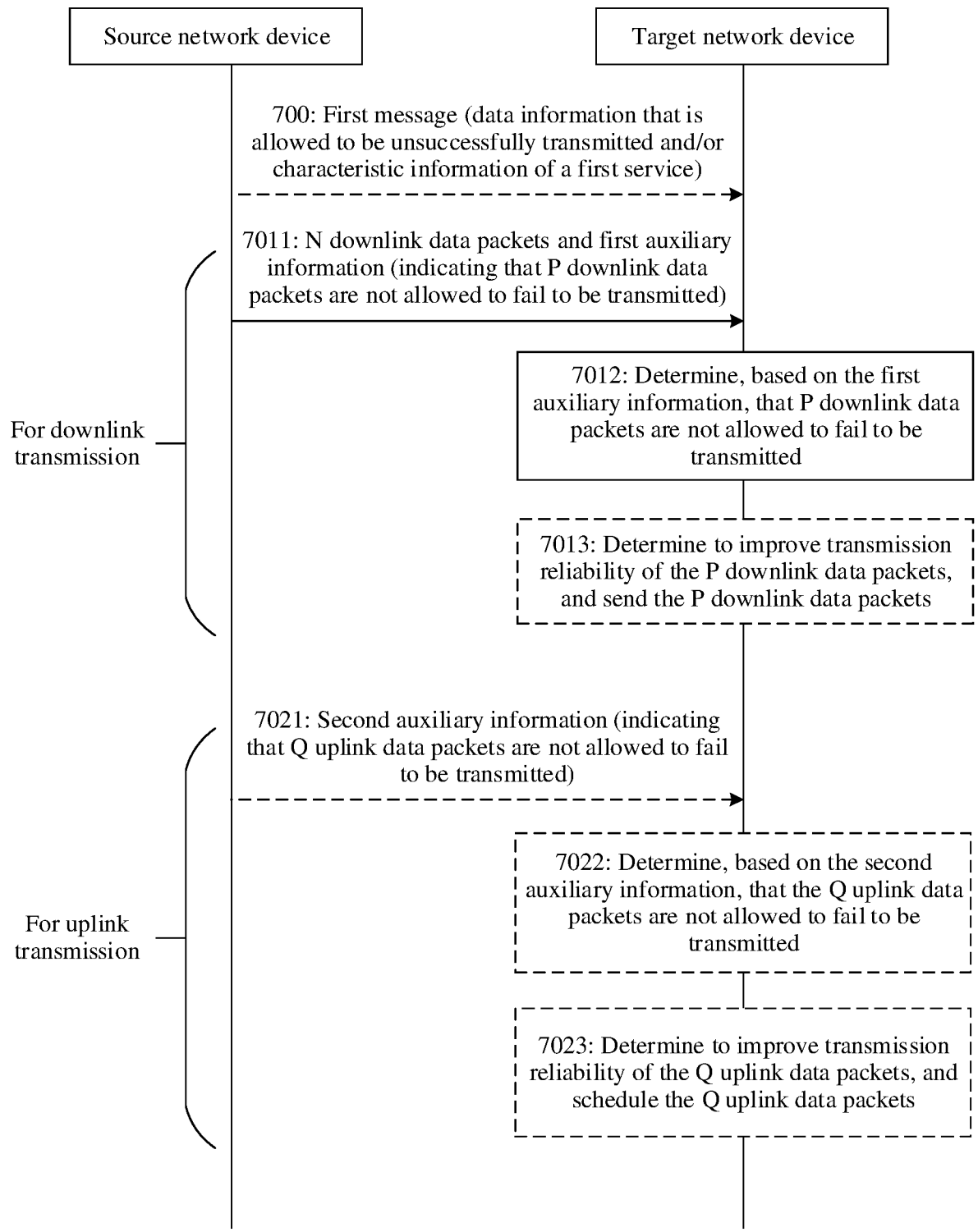
FIG. 7 is a schematic flowchart corresponding to a communication method according to Embodiment 2 of this application.

FIG. 7 is a schematic flowchart corresponding to a communication method according to Embodiment 2 of this application. As shown in FIG. 7, the method includes the following steps.

Step 100: A source network device sends a first message to a target network device, where the first message includes data information that is allowed to be unsuccessfully transmitted and characteristic information of a first service. Correspondingly, the target network device may receive the first message, and obtain the data information that is allowed to be unsuccessfully transmitted and the characteristic information of the first service.

Step 7011: The source network device sends N downlink data packets of the first service and first auxiliary information to the target network device. The first auxiliary information indicates that P downlink data packets are not allowed to fail to be transmitted.

The P downlink data packets may be first P downlink data packets of the N downlink data packets. In an example, the first auxiliary information may include identifiers of the P downlink data packets. Herein, the identifiers of the P downlink data packets may be PDCP SNs of the P downlink data packets, may be count values of the P downlink data packets, or may be other information identifying the P downlink data packets.

For the PDCP SNs of the P downlink data packets, it should be noted that referring to step 409 in FIG. 4, if an SN status transfer message includes a DL PDCP SN, the identifiers of the P downlink data packets may be the PDCP SNs of the P downlink data packets. If the SN status transfer message includes a first sequence number, to be specific, if a second network device allocates the PDCP SN to the downlink data packet starting from the first sequence number, the identifiers of the P downlink data packets may be PDCP SNs allocated to the P downlink data packets starting from the first sequence number. If the second network device allocates the PDCP SN to the downlink data packet starting from the second sequence number, the identifiers of the P downlink data packets may be PDCP SNs allocated to the P downlink data packets starting from the second sequence number.

Step 7012: The target network device receives the N downlink data packets and the first auxiliary information, and determines, based on the first auxiliary information, that the P downlink data packets are not allowed to fail to be transmitted.

Optionally, the method may further include step 7013: The target network device determines to improve transmission reliability of the P downlink data packets, and sends the P downlink data packets.

Step 7021: The source network device sends second auxiliary information to the target network device. The second auxiliary information indicates that Q uplink data packets are not allowed to fail to be transmitted.

Step 7022: The target network device receives the second auxiliary information, and determines, based on the second auxiliary information, that the Q downlink data packets are not allowed to fail to be transmitted.

The Q uplink data packets may be uplink data packets to be sent by a terminal device to the target network device. In an example, the second auxiliary information may include identifiers of the Q uplink data packets.

Optionally, the method may further include step 7023: The target network device determines to improve transmission reliability of the Q uplink data packets, and schedules the Q uplink data packets.

In the foregoing solution, the downlink transmission is used as an example. The source network device sends the first auxiliary information to the target network device, where the first auxiliary information indicates that the P downlink data packets are not allowed to fail to be transmitted. Further, the target network device may improve the transmission reliability of the P downlink data packets based on the first auxiliary information, avoid that the P downlink data packets fail to be transmitted, and further avoid service interruption at an application layer. In other words, the source network device may determine the downlink data packet that is not allowed to fail to be transmitted, and further indicate the downlink data packet to the target network device, so that the target network device can directly learn of, in time based on the first auxiliary information, the downlink data packet that is not allowed to fail to be transmitted, to effectively reduce processing burden of the target network device.

Embodiment 3

Figure 8:
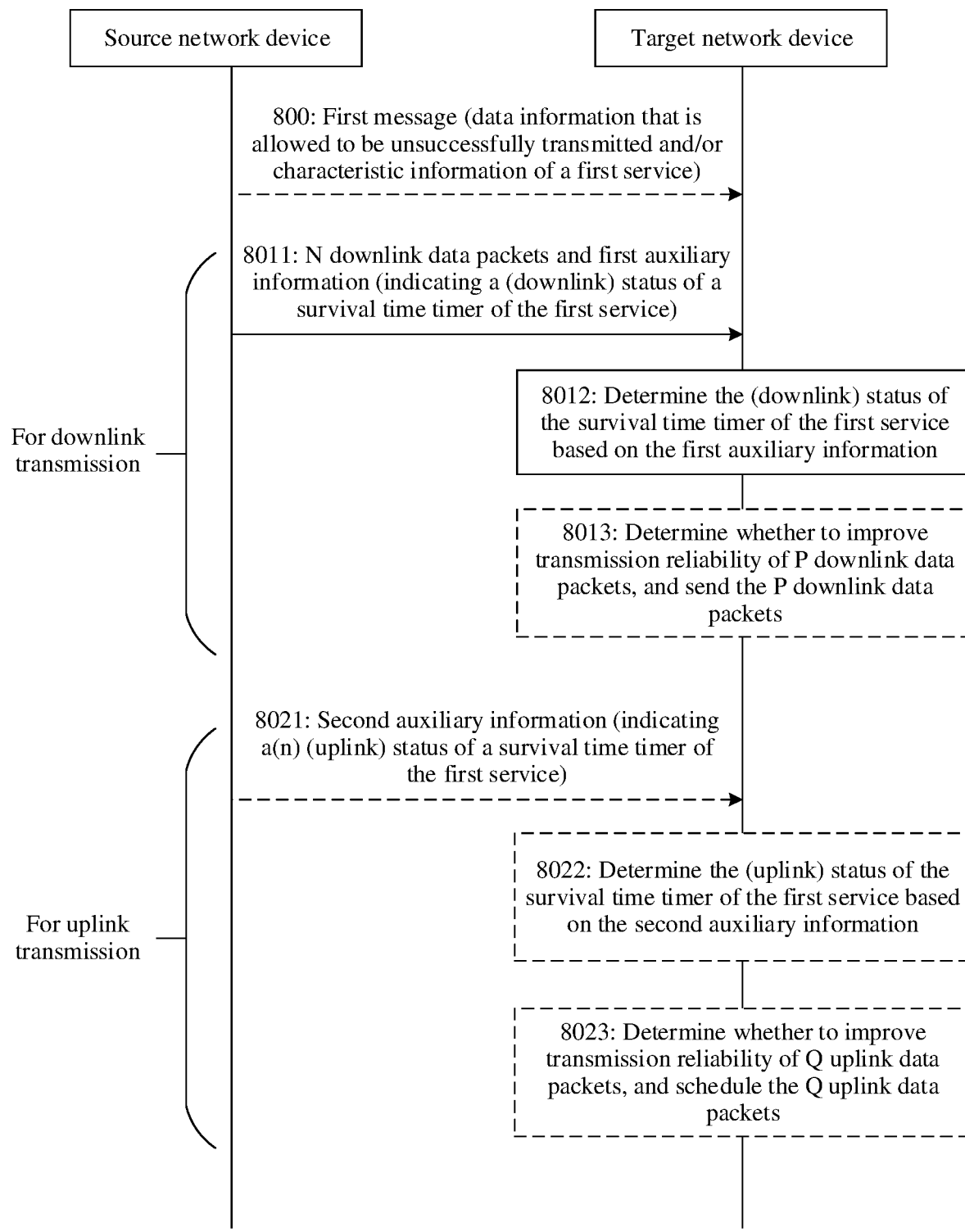
FIG. 8 is a schematic flowchart corresponding to a communication method according to Embodiment 3 of this application.

FIG. 8 is a schematic flowchart corresponding to a communication method according to Embodiment 3 of this application. As shown in FIG. 8, the method includes the following steps.

Step 800: A source network device sends a first message to a target network device, where the first message includes data information that is allowed to be unsuccessfully transmitted and characteristic information of a first service. Correspondingly, the target network device may receive the first message, and obtain the data information that is allowed to be unsuccessfully transmitted and the characteristic information of the first service.

Step 8011: The source network device sends N downlink data packets of the first service and first auxiliary information to the target network device. The first auxiliary information indicates a (downlink) status of a survival time timer of the first service.

In an example, the first auxiliary information may include at least one of the following: (1) Status information of the survival time timer. For example, the status information includes one bit. If a value of the bit is 1, it indicates that the survival time timer is in a running state; or if a value of the bit is 0, it indicates that the survival time timer is in a stopped state. (2) Time information that a downlink data packet for triggering the survival time timer arrives at the source network device. (3) Identifier of a downlink data packet for triggering the survival time timer. When the first auxiliary information includes (2) and/or (3), it may be understood that the first auxiliary information implicitly indicates that the survival time timer is in the running state.

Step 8012: The target network device receives the N downlink data packets and the first auxiliary information, and determines the (downlink) status of the survival time timer based on the first auxiliary information.

Optionally, the method may further include step 8013: The target network device determines whether to improve transmission reliability of P uplink data packets, and sends the P uplink data packets.

Herein, if the first auxiliary information includes the status information of the survival time timer, the target network device determines, based on the status information, that the survival time timer is in the running state, and the transmission reliability of the P downlink data packets may be improved, to avoid interruption caused by expiration of the survival time timer; or if the target network device determines that the survival time timer is in the stopped state, the transmission reliability of the P downlink data packets may not be improved.

If the first auxiliary information includes the time information that the downlink data packet for triggering the survival time timer arrives at the source network device, for example, the downlink data packet for triggering the survival time timer is the data packet 6 shown in FIG. 6, the first auxiliary information may include time information that the data packet 6 arrives at the source network device. In this case, the target network device may determine, based on the first auxiliary information, that the survival time timer is in the running state. In an example, the target network device may directly improve the transmission reliability of the P downlink data packets. In still another example, the target network device may determine, based on the time information that the data packet 6 arrives at the source network device and the data information that is allowed to be unsuccessfully transmitted, whether the transmission reliability of the P downlink data packets needs to be improved. For example, the data information that is allowed to be unsuccessfully transmitted includes a third threshold, and the P data packets include a data packet 7. For example, the third threshold is 4. Even if the data packet 7 fails to be transmitted, an application layer is not interrupted. Therefore, the target network device may not improve transmission reliability of the data packet 7. For another example, the third threshold is 2. If the data packet 7 fails to be transmitted, interruption occurs at the application layer. Therefore, the target network device may improve the transmission reliability of the data packet 7.

If the first auxiliary information includes the identifier of the downlink data packet for triggering the survival time timer, refer to the foregoing descriptions that the first auxiliary information includes the time information that the downlink data packet for triggering the survival time timer arrives at the source network device. Details are not described again.

It can be learned from the foregoing content that when the first auxiliary information includes (2) and/or (3), the target network device can more accurately determine whether the transmission reliability of the P data packets needs to be improved.

Step 8021: The source network device sends second auxiliary information to the target network device. The second auxiliary information indicates a status of a(n) (uplink) survival time timer of the first service.

Step 8022: The target network device receives the second auxiliary information, and determines the status of the (uplink) survival time timer based on the second auxiliary information.

Optionally, the method may further include step 8023: The target network device determines whether to improve transmission reliability of Q uplink data packets, and schedules the Q uplink data packets.

In the foregoing solution, the downlink transmission is used as an example. The source network device sends the first auxiliary information to the target network device, where the first auxiliary information indicates the (downlink) status of the survival time timer of the first service, so that the target network device can determine, based on the status of the survival time timer, whether to improve the transmission reliability of the P data packets, to effectively avoid service interruption caused at an application layer due to handover of a terminal device.

Embodiment 4

Figure 9:
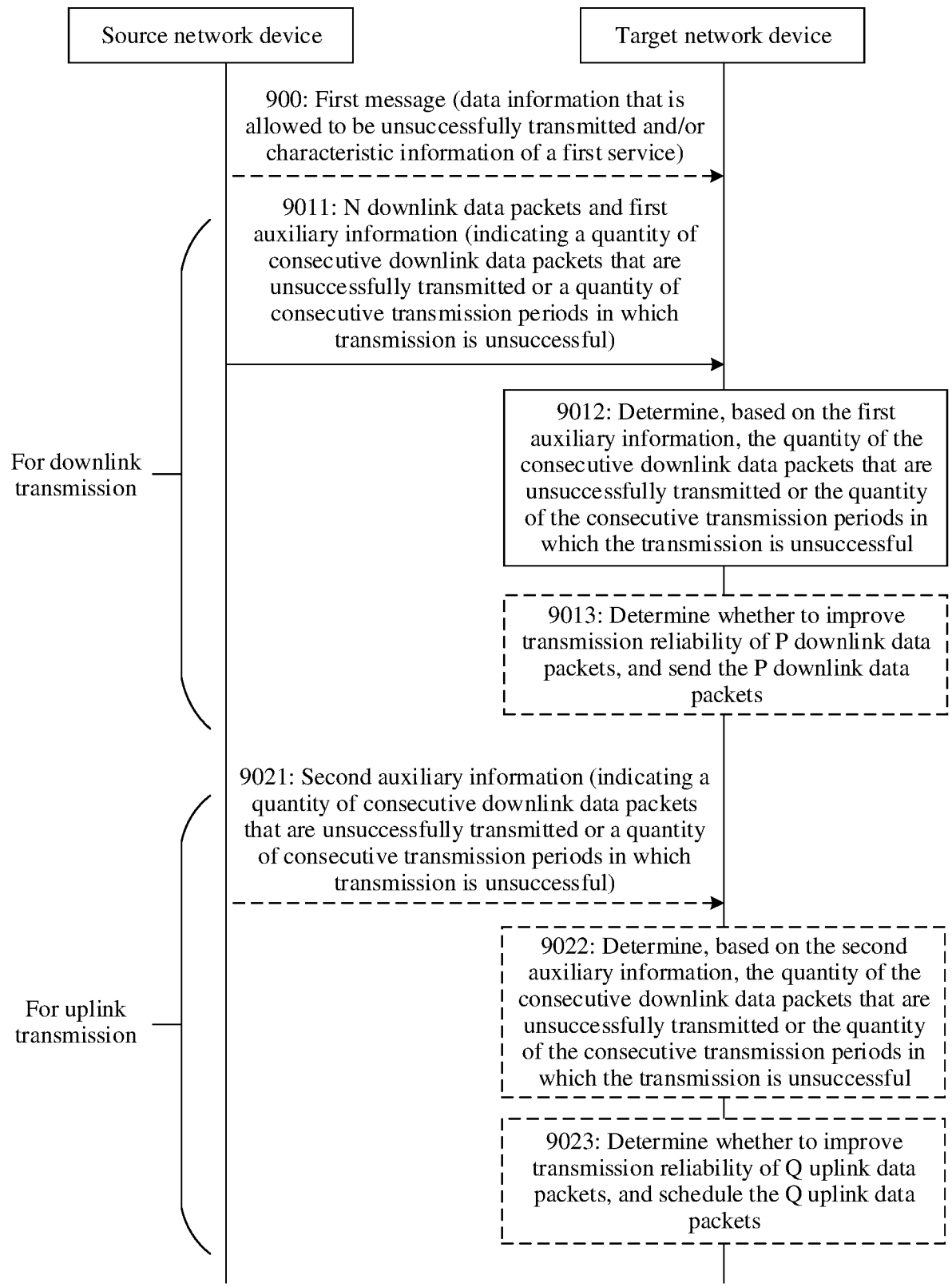
FIG. 9 is a schematic flowchart corresponding to a communication method according to Embodiment 4 of this application.

FIG. 9 is a schematic flowchart corresponding to a communication method according to Embodiment 4 of this application. As shown in FIG. 9, the method includes the following steps.

Step 900: A source network device sends a first message to a target network device, where the first message includes data information that is allowed to be unsuccessfully transmitted and characteristic information of a first service. Correspondingly, the target network device may receive the first message, and obtain the data information that is allowed to be unsuccessfully transmitted and the characteristic information of the first service.

Step 9011: The source network device sends N downlink data packets of the first service and first auxiliary information to the target network device. The first auxiliary information indicates a quantity of consecutive downlink data packets unsuccessfully transmitted or a quantity of consecutive transmission periods in which transmission is unsuccessful. The last downlink data packet of the consecutive downlink data packets that are unsuccessfully transmitted is adjacent to the $1^{st}$ downlink data packet of the N downlink data packets. A downlink data packet included in a next adjacent transmission period of the consecutive transmission periods in which the transmission is unsuccessful belongs to the N downlink data packets.

Step 9012: The target network device receives the first auxiliary information, and determines the quantity of the consecutive data packets that are unsuccessfully transmitted or the quantity of the consecutive transmission periods in which the transmission is unsuccessful.

Optionally, the method may further include step 9013: The target network device determines whether to improve transmission reliability of P uplink data packets, and sends the P uplink data packets.

Herein, if the first auxiliary information indicates the quantity of the consecutive data packets that are unsuccessfully transmitted, the target network device may determine whether the quantity of the consecutive downlink data packets that are unsuccessfully transmitted is greater than or equal to a third threshold. If yes, the transmission reliability of the P downlink data packets may be improved. If no, the transmission reliability of the P downlink data packets may not be improved.

If the first auxiliary information indicates the quantity of the consecutive transmission periods in which the transmission is unsuccessful, the target network device may determine whether the quantity of the consecutive transmission periods in which the transmission is unsuccessful is greater than or equal to a fourth threshold. If yes, the transmission reliability of the P downlink data packets may be improved. If no, the transmission reliability of the P downlink data packets may not be improved.

Step 9021: The source network device sends second auxiliary information to the target network device. The second auxiliary information indicates a quantity of consecutive uplink data packets unsuccessfully transmitted or a quantity of consecutive transmission periods in which transmission is unsuccessful.

Step 9022: The target network device determines, based on the second auxiliary information, the quantity of the consecutive uplink data packets that are unsuccessfully transmitted or the quantity of the consecutive transmission periods in which the transmission is unsuccessful.

Optionally, the method may further include step 9023: The target network device determines whether to improve transmission reliability of Q uplink data packets, and schedules the Q uplink data packets.

In the foregoing solution, the downlink transmission is used as an example. The source network device sends the first auxiliary information to the target network device. The first auxiliary information indicates the quantity of the consecutive downlink data packets that are unsuccessfully transmitted or the quantity of the consecutive transmission periods in which the transmission is unsuccessful. To be specific, the source network device may determine the quantity of the consecutive downlink data packets that are unsuccessfully transmitted or the quantity of the consecutive transmission periods in which the transmission is unsuccessful, and indicate the quantity to the target network device, so that the target network device can determine whether to improve the transmission reliability of the P data packets. This can effectively avoid service interruption caused at an application layer due to handover of a terminal device.

For Embodiment 1 to Embodiment 4, it should be noted that:

(i) Step numbers in the flowcharts described in Embodiment 1 to Embodiment 4 are merely examples of an execution procedure, and do not constitute any limitation on an execution sequence of the steps. In embodiments of this application, there is no strict execution sequence between steps that do not have a time sequence dependency relationship with each other. In addition, not all the steps shown in the flowcharts are mandatory steps, and some steps may be added to or deleted from the flowcharts based on an actual requirement.

(2) The foregoing focuses on differences between different embodiments in Embodiment 1 to Embodiment 4. For other content except the differences, Embodiment 1 to Embodiment 4 may be mutually referenced. For example, the first message in Embodiment 2 to Embodiment 4 may refer to the descriptions in Embodiment 1. In addition, each embodiment in Embodiment 1 to Embodiment 4 is described in detail for downlink transmission, and for implementation of uplink transmission, adaptively refer to the downlink transmission. In addition, N, M, W, Y, P, Q, K1, K2, and the like in embodiments of this application may all be positive integers.

(3) Some messages in a 5G communication system are used in Embodiment 1 to Embodiment 4. However, during specific implementation, different messages or message names may be used. This is not limited in embodiments of this application.

The foregoing mainly describes the solutions provided in embodiments of this application from the perspective of device interaction. It may be understood that, to implement the foregoing functions, the source network device and the target network device of the terminal device may include corresponding hardware structures and/or software modules for performing the functions. A person skilled in the art should easily be aware that, in combination with units and algorithm steps of the examples described in embodiments disclosed in this specification, embodiments of this application may be implemented by hardware or a combination of hardware and computer software. Whether a function is executed by hardware or hardware driven by computer software depends on particular applications and design constraints of technical solutions. A person skilled in the art may use different methods to implement the described functions for each particular application, but it should not be considered that the implementation goes beyond the scope of this application.

In embodiments of this application, division into functional units may be performed on the source network device and the target network device based on the foregoing method examples. For example, division into each functional unit may be based on each corresponding function, or two or more functions may be integrated into one unit. The integrated unit may be implemented in a form of hardware, or may be implemented in a form of a software functional unit.

Figure 10:
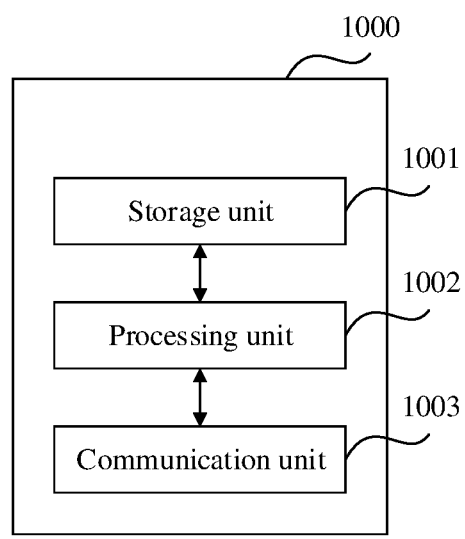
FIG. 10 is a possible schematic block diagram of an apparatus according to an embodiment of this application.

When the integrated unit is used, FIG. 10 is a possible schematic block diagram of an apparatus according to an embodiment of this application. As shown in FIG. 10, an apparatus 1000 may include a processing unit 1002 and a communication unit 1003. The processing unit 1002 is configured to control and manage an action of the apparatus 1000. The communication unit 1003 is configured to support communication between the apparatus 1000 and another device. Optionally, the communication unit 1003 is also referred to as a transceiver unit, and may include a receiving unit and/or a sending unit, respectively configured to perform a receiving operation and a sending operation. The apparatus 1000 may further include a storage unit 1001, configured to store program code and/or data of the apparatus 1000.

The apparatus 1000 may be the target network device in the foregoing embodiments, or may be a chip disposed in the target network device. The processing unit 1002 may support the apparatus 1000 in performing actions of the target network device in the foregoing method examples. Alternatively, the processing unit 1002 mainly performs an internal action of the target network device in the method examples, and the communication unit 1003 may support communication between the apparatus 1000 and another device.

Specifically, in an embodiment, the communication unit 1003 is configured to receive N data packets of a first service and auxiliary information from a source network device of a terminal device, where the auxiliary information indicates a transmission status of at least one data packet before the N data packets; and the processing unit 1002 is configured to determine the transmission status of the at least one data packet based on the auxiliary information, where N is a positive integer.

In a possible design, the auxiliary information includes an identifier of a data packet before the N data packets that is unsuccessfully transmitted; or the auxiliary information includes an identifier of the $1^{st}$ data packet before the N data packets that is unsuccessfully transmitted, and transmission status information of M data packets after the $1^{st}$ data packet that is unsuccessfully transmitted, where the last data packet of the M data packets is adjacent to the $1^{st}$ data packet of the N data packets, and M is a positive integer.

In a possible design, the auxiliary information further indicates a correspondence between the data packet and a transmission period.

In a possible design, the auxiliary information includes an identifier of a data packet included in at least one transmission period; or the auxiliary information includes an identifier of the $1^{st}$ data packet or the last data packet included in each transmission period of at least one transmission period, and a quantity of data packets or an amount of data included in the transmission period.

In a possible design, the communication unit 1003 is further configured to receive, from the source network device, data information that is allowed to be unsuccessfully transmitted, where the data information that is allowed to be unsuccessfully transmitted is determined based on survival time of the first service.

In a possible design, the data information that is allowed to be unsuccessfully transmitted includes a maximum quantity of consecutive data packets that are allowed to be unsuccessfully transmitted and/or a maximum quantity of consecutive transmission periods in which transmission is allowed to be unsuccessful. The transmission period in which transmission is unsuccessful is a transmission period in which there is a data packet unsuccessfully transmitted, a transmission period in which a quantity of data packets unsuccessfully transmitted is greater than or equal to a first threshold, or a transmission period in which an amount of data unsuccessfully transmitted is greater than or equal to a second threshold.

The apparatus 1000 may be the source network device in the foregoing embodiments, or may be a chip disposed in the source network device. The processing unit 1002 may support the apparatus 1000 in performing actions of the source network device in the foregoing method examples. Alternatively, the processing unit 1002 mainly performs an internal action of the source network device in the method examples, and the communication unit 1003 may support communication between the apparatus 1000 and another device.

Specifically, in an embodiment, the processing unit 1002 is configured to determine auxiliary information; and the communication unit 1003 is configured to send N data packets of a first service and the auxiliary information to a target network device of the terminal device, where the auxiliary information indicates a transmission status of at least one data packet before the N data packets, and N is a positive integer.

In a possible design, the auxiliary information includes an identifier of a data packet before the N data packets that is unsuccessfully transmitted; or the auxiliary information includes an identifier of the $1^{st}$ data packet before the N data packets that is unsuccessfully transmitted, and transmission status information of M data packets after the $1^{st}$ data packet that is unsuccessfully transmitted, where the last data packet of the M data packets is adjacent to the $1^{st}$ data packet of the N data packets, and M is a positive integer.

In a possible design, the auxiliary information further indicates a correspondence between the data packet and a transmission period.

In a possible design, the auxiliary information includes an identifier of a data packet included in at least one transmission period; or the auxiliary information includes an identifier of the $1^{st}$ data packet or the last data packet included in each transmission period of at least one transmission period, and a quantity of data packets or an amount of data included in the transmission period.

In a possible design, the communication unit 1003 is further configured to send, to the target network device, data information that is allowed to be unsuccessfully transmitted, where the data information that is allowed to be unsuccessfully transmitted is determined based on survival time of the first service.

In a possible design, the data information that is allowed to be unsuccessfully transmitted includes a maximum quantity of consecutive data packets that are allowed to be unsuccessfully transmitted and/or a maximum quantity of consecutive transmission periods in which transmission is allowed to be unsuccessful. The transmission period in which transmission is unsuccessful is a transmission period in which there is a data packet unsuccessfully transmitted, a transmission period in which a quantity of data packets unsuccessfully transmitted is greater than or equal to a first threshold, or a transmission period in which an amount of data unsuccessfully transmitted is greater than or equal to a second threshold.

It should be understood that division into the units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, the units may be all or partially integrated, or may be implemented independently. The processing element herein may also be referred to as a processor, and may be an integrated circuit having a signal processing capability. During implementation, the steps in the foregoing methods or the foregoing units may be implemented by using a hardware integrated logic circuit in a processor element, or may be implemented in the form of software invoked by the processing element.

In an example, a unit in any one of the foregoing apparatuses may be one or more integrated circuits configured to implement the foregoing method, for example, one or more application-specific integrated circuits (Application-Specific Integrated Circuit, ASIC), one or more microprocessors (digital signal processor, DSP), one or more field programmable gate arrays (Field Programmable Gate Array, FPGA), or a combination of at least two of these integrated circuit forms. For another example, when the unit in the apparatus may be implemented in a form of scheduling a program by a processing element, the processing element may be a processor, for example, a general-purpose central processing unit (central processing unit, CPU), or another processor that can invoke the program. For still another example, the units may be integrated and implemented in a form of a system-on-a-chip (system-on-a-chip, SOC).

The foregoing unit for reception is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing unit for sending may be an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 11:
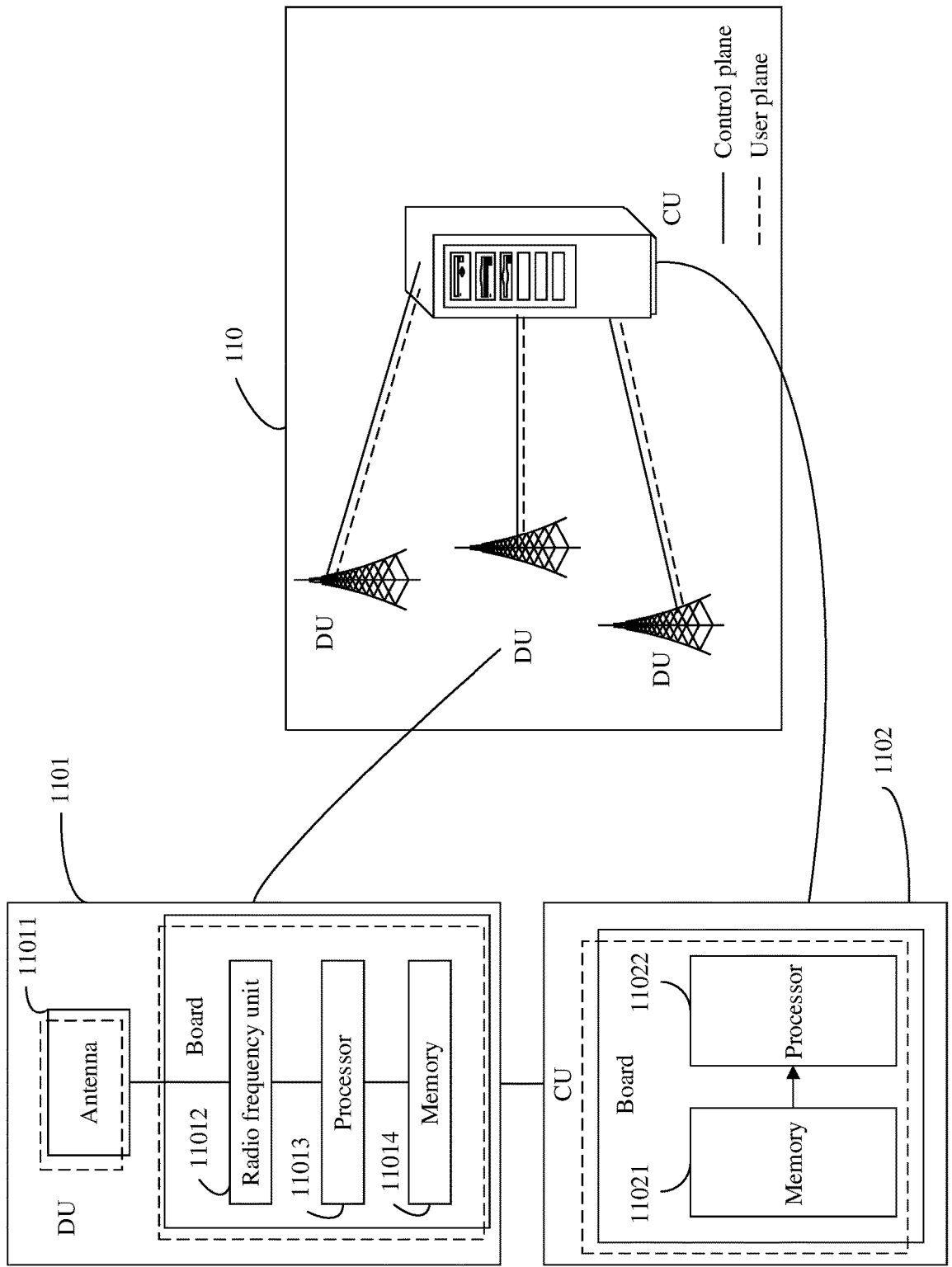
FIG. 11 is a schematic diagram of a structure of a network device according to an embodiment of this application.

FIG. 11 is a schematic diagram of a structure of a network device according to an embodiment of this application. The network device (or a base station) may be applied to the system architecture shown in FIG. 1, to perform functions of the source network device or the target network device in the foregoing method embodiments. The network device 110 may include one or more DUs 1101 and one or more CUs 1102. The DU 1101 may include at least one antenna 11011, at least one radio frequency unit 11012, at least one processor 11013, and at least one memory 11014. The DU 1101 is mainly configured to: send and receive a radio frequency signal, perform conversion between a radio frequency signal and a baseband signal, and perform partial baseband processing. The CU 1102 may include at least one processor 11022 and at least one memory 11021.

The CU 1102 is mainly configured to perform baseband processing, control the network device, and the like. The DU 1101 and the CU 1102 may be physically disposed together, or may be physically disposed separately, namely, a distributed base station. The CU 1102 is a control center of the network device, may also be referred to as a processing unit, and is mainly configured to complete a baseband processing function. For example, the CU 1102 may be configured to control the network device to perform an operation procedure related to the network device in the foregoing method embodiments.

In addition, optionally, the network device 110 may include one or more radio frequency units, one or more DUs, and one or more CUs. The DU may include the at least one processor 11013 and the at least one memory 11014, the radio frequency unit may include the at least one antenna 11011 and the at least one radio frequency unit 11012, and the CU may include the at least one processor 11022 and the at least one memory 11021.

In an example, the CU 1102 may include one or more boards, and the plurality of boards may jointly support a radio access network (for example, a 5G network) of a single access standard, or may separately support radio access networks (such as an LTE network, a 5G network, or another network) of different access standards. The memory 11021 and the processor 11022 may serve one or more boards. In other words, a memory and a processor may be disposed on each board. Alternatively, the plurality of boards may share a same memory and a same processor. In addition, a necessary circuit may further be disposed on each board. The DU 1101 may include one or more boards, and the plurality of boards may jointly support a radio access network (for example, a 5G network) of a single access standard, or may separately support radio access networks (such as a 5G network or another network) of different access standards. The memory 11014 and the processor 11013 may serve one or more boards. In other words, a memory and a processor may be disposed on each board. Alternatively, the plurality of boards may share a same memory and a same processor. In addition, a necessary circuit may further be disposed on each board.

The network device shown in FIG. 11 can implement processes related to the source network device or the target network device in the foregoing illustrated method embodiments. Operations and/or functions of the modules in the network device shown in FIG. 11 are intended to implement the corresponding procedures in the foregoing method embodiments. For details, refer to the descriptions in the foregoing method embodiments. To avoid repetition, detailed descriptions are properly omitted herein.

The terms "system" and "network" may be used interchangeably in embodiments of this application. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally represents an "or" relationship between the associated objects. At least one of the following items (pieces) or a similar expression thereof indicates any combination of these items, including a single item (piece) or any combination of a plurality of items (pieces). For example, "at least one of A, B, and C" includes A, B, C, AB, AC, BC, or ABC. In addition, unless otherwise stated, ordinal numbers such as "first" and "second" in embodiments of this application are used to distinguish between a plurality of objects, and are not used to limit an order, a time sequence, priorities, or importance of the plurality of objects.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An apparatus, comprising:
   at least one processor; and
   a non-transitory computer readable storage medium storing a program that is executable by the at least one processor, the program including instructions to:
   receive N data packets of a first service and auxiliary information from a source network device of a terminal device, wherein the auxiliary information indicates a transmission status of at least one data packet before the N data packets, and N is a positive integer, and wherein the auxiliary information further indicates a correspondence between the at least one data packet and a transmission period; and
   determine the transmission status of the at least one data packet based on the auxiliary information.

2. The apparatus according to claim 1, wherein the auxiliary information comprises an identifier of the at least one data packet before the N data packets, and the at least one data packet is unsuccessfully transmitted.

3. The apparatus according to claim 1, wherein:
   the auxiliary information comprises an identifier of the at least one data packet, and the at least one data packet is comprised in the transmission period; or
   the auxiliary information comprises an identifier of a 1st data packet or a last data packet comprised in each transmission period of at least one transmission period, and a quantity of data packets comprised in each transmission period of the at least one transmission period.

4. The apparatus according to claim 1, wherein the program further includes instructions to:
   receive, from the source network device, data information that is allowed to be unsuccessfully transmitted, wherein the data information that is allowed to be unsuccessfully transmitted is determined based on survival time of the first service.

5. The apparatus according to claim 4, wherein the data information that is allowed to be unsuccessfully transmitted comprises a maximum quantity of consecutive data packets that are allowed to be unsuccessfully transmitted or a maximum quantity of consecutive transmission periods in which transmission is allowed to be unsuccessful, wherein a transmission period in which transmission is unsuccessful is a transmission period in which there is at least one data packet that is unsuccessfully transmitted, a transmission period in which a quantity of data packets that are unsuccessfully transmitted is greater than or equal to a first threshold, or a transmission period in which an amount of data unsuccessfully transmitted is greater than or equal to a second threshold.

6. An apparatus, comprising:
   at least one processor; and
   a non-transitory computer readable storage medium storing a program that is executable by the at least one processor, the program including instructions to:

determine auxiliary information; and
send N data packets of a first service and the auxiliary information to a target network device of a terminal device, wherein the auxiliary information indicates a transmission status of at least one data packet before the N data packets, and N is a positive integer, wherein the auxiliary information further indicates a correspondence between the at least one data packet and a transmission period.

7. The apparatus according to claim 1, wherein the auxiliary information comprises an identifier of a 1st data packet before the N data packets that is unsuccessfully transmitted, and transmission status information of M data packets after the 1st data packet that is unsuccessfully transmitted, wherein a last data packet of the M data packets is adjacent to a 1st data packet of the N data packets, and M is a positive integer.

8. The apparatus according to claim 1, further comprising:
receive second auxiliary information from the source network device; and
determine a correspondence between an uplink data packet of the N data packets and a transmission period based on the second auxiliary information.

9. The apparatus according to claim 6, wherein:
the auxiliary information comprises an identifier of the at least one data packet, and the at least one data packet is comprised in at least one transmission period; or
the auxiliary information comprises an identifier of a 1st data packet or a last data packet comprised in each transmission period of at least one transmission period, and a quantity of data packets comprised in each transmission period of the at least one transmission period.

10. The apparatus according to claim 6, wherein the auxiliary information comprises an identifier of the at least one data packet before the N data packets, and the at least one data packet is unsuccessfully transmitted.

11. The apparatus according to claim 6, wherein the program further includes instructions to:
send, to the target network device, data information that is allowed to be unsuccessfully transmitted, wherein the data information that is allowed to be unsuccessfully transmitted is determined based on survival time of the first service.

12. The apparatus according to claim 11, wherein the data information that is allowed to be unsuccessfully transmitted comprises a maximum quantity of consecutive data packets that are allowed to be unsuccessfully transmitted and/or a maximum quantity of consecutive transmission periods in which transmission is allowed to be unsuccessful, wherein a transmission period in which transmission is unsuccessful is a transmission period in which a data packet is unsuccessfully transmitted, a transmission period in which a quantity of data packets that are unsuccessfully transmitted is greater than or equal to a first threshold, or a transmission period in which an amount of data unsuccessfully transmitted is greater than or equal to a second threshold.

13. The apparatus according to claim 6, wherein the auxiliary information comprises an identifier of a 1st data packet before the N data packets that is unsuccessfully transmitted, and transmission status information of M data packets after the 1st data packet that is unsuccessfully transmitted, wherein a last data packet of the M data packets is adjacent to the 1st data packet of the N data packets, and M is a positive integer.

14. A system, comprising:
a source network device of a terminal device; and
a target network device of the terminal device;
wherein the source network device is configured to:
determine auxiliary information; and
send N data packets of a first service and the auxiliary information to the target network device of the terminal device, wherein the auxiliary information indicates a transmission status of at least one data packet before the N data packets, and N is a positive integer, and wherein the auxiliary information further indicates a correspondence between the at least one data packet and a transmission period; and
wherein the target network device is configured to:
receive the N data packets of the first service and the auxiliary information; and
determine the transmission status of the at least one data packet based on the auxiliary information.

15. The system according to claim 14, wherein:
the auxiliary information comprises an identifier of the at least one data packet before the N data packets, and the at least one data packet is unsuccessfully transmitted.

16. The system according to claim 14, wherein:
the auxiliary information comprises an identifier of a 1st data packet before the N data packets that is unsuccessfully transmitted, and transmission status information of M data packets after the 1st data packet that is unsuccessfully transmitted, wherein a last data packet of the M data packets is adjacent to the 1st data packet of the N data packets, and M is a positive integer.

17. The system according to claim 14, wherein:
the auxiliary information comprises an identifier of the at least one data packet, and the at least one data packet is comprised in at least one transmission period.

18. The system according to claim 14, wherein:
the auxiliary information comprises an identifier of a 1st data packet or a last data packet comprised in each transmission period of at least one transmission period, and a quantity of data packets comprised in each transmission period of the at least one transmission period.

19. The system according to claim 14, wherein the source network device is further configured to:
send, to the target network device, data information that is allowed to be unsuccessfully transmitted, wherein the data information that is allowed to be unsuccessfully transmitted is determined based on survival time of the first service.

20. The system according to claim 19, wherein the data information that is allowed to be unsuccessfully transmitted comprises a maximum quantity of consecutive data packets that are allowed to be unsuccessfully transmitted and/or a maximum quantity of consecutive transmission periods in which transmission is allowed to be unsuccessful, wherein a transmission period in which transmission is unsuccessful is a transmission period in which a data packet is unsuccessfully transmitted, a transmission period in which a quantity of data packets that are unsuccessfully transmitted is greater than or equal to a first threshold, or a transmission period in which an amount of data unsuccessfully transmitted is greater than or equal to a second threshold.

* * * * *